(12) United States Patent
Linevsky et al.

(10) Patent No.: US 10,210,554 B2
(45) Date of Patent: Feb. 19, 2019

(54) SYSTEM AND METHOD FOR AUTOMATICALLY DISTRIBUTING AND CONTROLLING ELECTRONIC CATALOG CONTENT FROM REMOTE MERCHANT COMPUTERS TO A CATALOG SERVER COMPUTER OVER A COMMUNICATIONS NETWORK

(71) Applicant: America by Mail, Inc., Fort Lauderdale, FL (US)

(72) Inventors: Richard Linevsky, Weston, FL (US); Lauren Singer, Davie, FL (US); Matthew Craine, Fort Lauderdale, FL (US); Nigel Gray, Weston, FL (US)

(73) Assignee: America by Mail, Inc., Fort Lauderdale, FL (US)

( * ) Notice: Subject to any disclaimer, the term of this patent is extended or adjusted under 35 U.S.C. 154(b) by 0 days.

(21) Appl. No.: 14/858,260

(22) Filed: Sep. 18, 2015

(65) Prior Publication Data

US 2016/0012499 A1    Jan. 14, 2016

Related U.S. Application Data

(63) Continuation of application No. 13/242,966, filed on Sep. 23, 2011, now abandoned.
(Continued)

(51) Int. Cl.
*G06Q 30/00*   (2012.01)
*G06Q 30/06*   (2012.01)
*G06Q 30/02*   (2012.01)

(52) U.S. Cl.
CPC ..... *G06Q 30/0603* (2013.01); *G06Q 30/0277* (2013.01); *G06Q 30/0633* (2013.01);
(Continued)

(58) Field of Classification Search
CPC ............... G06Q 30/0601; G06Q 30/0603
(Continued)

(56) References Cited

U.S. PATENT DOCUMENTS 5,890,175 A * 3/1999 Wong ............ G06F 17/21
705/26.8
7,162,443 B2   1/2007 Shah
(Continued)

OTHER PUBLICATIONS

Catalogs.com, dated Apr. 2, 2009, available at www.archive.org.*

*Primary Examiner* — Brandy A Zukanovich
(74) *Attorney, Agent, or Firm* — Zaretsky Group PC; Howard Zaretsky

(57) ABSTRACT

A system and method of browsing electronic catalogs from a plurality of merchants. The electronic catalog system emulates the portability and usability of a traditional paper and ink catalog, especially when realized on a tablet or mobile device. Product data feeds from multiple merchants are collected and processed to build a product database. A server retrieves product data and serves it to users browsing the electronic catalogs. Users can request more detailed information and order products through the server and merchant websites. Users communicate with the server and merchant websites either through a standalone software application or via a standard web browser. Merchants are able to update the contents of their electronic catalogs through a merchant portal.

23 Claims, 30 Drawing Sheets

Related U.S. Application Data

(60) Provisional application No. 61/386,359, filed on Sep. 24, 2010.

(52) U.S. Cl.
CPC ..... *G06Q 30/0635* (2013.01); *G06Q 30/0641* (2013.01); *G06Q 30/0643* (2013.01)

(58) Field of Classification Search
USPC .............................................. 705/26.1, 27.1
See application file for complete search history.

(56) References Cited

U.S. PATENT DOCUMENTS

| | | |
|---|---|---|
| 7,266,516 B2 | 9/2007 | Song et al. |
| 7,324,964 B2 | 1/2008 | Gronberg et al. |
| 7,370,008 B1 | 5/2008 | Hill |
| 7,716,089 B1 | 5/2010 | Gavarini |
| 7,882,156 B2 | 2/2011 | Wykes et al. |
| 8,527,369 B1 | 9/2013 | Yalamanchi et al. |
| 9,043,328 B2 | 5/2015 | Ganesan et al. |
| 2002/0019763 A1 | 2/2002 | Linden et al. |
| 2002/0147656 A1* | 10/2002 | Tam ........................ G06Q 30/02 705/26.41 |
| 2002/0184116 A1 | 12/2002 | Tam et al. |
| 2003/0028451 A1 | 2/2003 | Ananian |
| 2005/0027611 A1 | 2/2005 | Wharton |
| 2005/0049939 A1 | 3/2005 | Lai et al. |
| 2006/0242192 A1 | 10/2006 | Musgrove et al. |
| 2009/0043674 A1* | 2/2009 | Minsky .............. G06Q 30/0603 705/26.8 |
| 2009/0228376 A1 | 9/2009 | Rollins et al. |
| 2010/0131492 A1 | 5/2010 | Nandiraju |
| 2010/0174623 A1 | 7/2010 | McPhie et al. |
| 2011/0247037 A1 | 10/2011 | Pandey et al. |
| 2012/0310914 A1 | 12/2012 | Khan |
| 2013/0060662 A1 | 3/2013 | Carlson et al. |
| 2013/0086112 A1 | 4/2013 | Everingham et al. |
| 2014/0278960 A1 | 9/2014 | Alvin |

* cited by examiner

FIG. 6

SYSTEM AND METHOD FOR AUTOMATICALLY DISTRIBUTING AND CONTROLLING ELECTRONIC CATALOG CONTENT FROM REMOTE MERCHANT COMPUTERS TO A CATALOG SERVER COMPUTER OVER A COMMUNICATIONS NETWORK

REFERENCE TO PRIORITY APPLICATIONS

This application claims priority to and is a continuation of U.S. application Ser. No. 13/242,966, filed Sep. 23, 2011, entitled "System For And Method Of Browsing Electronic Catalogs From Multiple Merchants," which claims priority to U.S. Provisional Application Ser. No. 61/386,359, filed Sep. 24, 2010, entitled "Paper Catalog Electronic Emulation System," both of which are incorporated herein by reference in their entirety.

FIELD OF THE INVENTION

The present invention relates to the field of electronic commerce, and more particularly relates to a system and method of browsing electronic catalogs from a plurality of merchants.

BACKGROUND OF THE INVENTION

Traditionally, catalogs have taken the form of printed paper bound and distributed to customers. Even in the age of the Internet, printed catalogs abound where although the merchant publishing the catalog may have an extensive e-commerce website where they offer their products for sale over the internet, the catalog they publish and distribute is paper based.

In addition, since publishing a catalog using traditional methods involving ink and paper can be very costly, smaller merchants may choose to not publish a catalog altogether. An electronic catalog is typically much cheaper to produce, thus opening up additional marketing opportunities to smaller companies that may not have published a catalog otherwise.

There is thus a need for an improved electronic catalog system that emulates the traditional experience of browsing paper and ink based catalogs. In particular, a need exists for a system that enables a user to easily and quickly browse, view and order products from multiple merchant catalogs on a mobile device or web browser. In addition, the system should enable merchants to provide their own product feed and update their electronic catalogs on a periodic basis.

SUMMARY OF THE INVENTION

The present invention is a system and method of browsing electronic catalogs from a plurality of merchants. In general, the electronic catalog system emulates the portability and usability of a traditional paper and ink catalog, especially when realized on a tablet or mobile device. Product data feeds from multiple merchants are collected and processed to build a product database. A server retrieves product data and serves it to users browsing the electronic catalogs. Users can request more detailed information and order products through the server and merchant websites. Users communicate with the server and merchant websites either through a standalone software application or via a standard web browser. Merchants are able to update the contents of their electronic catalogs through a merchant portal.

The electronic catalog system is applicable for use on any computer system such as desktop, laptop, netbook or notebook computers, wireless mobile devices, mobile phones, tablets, smartphones, etc. It is especially applicable, however, for use on tablet computers such as the Apple iPad, Android based tablets and other tablet formats with displays larger than that provided on the majority of smartphones.

Several advantages of using the electronic catalog system of the present invention include: (1) elimination of paper and ink based catalog production; (2) reducing the cost required to publish a catalog (electronic or paper based); (3) the ability to allow merchants to update and revise their electronic catalogs on demand or on a periodic basis; (4) providing users with one stop shopping for multiple merchants; and (5) providing users with multiple platform options in which to browse electronic catalogs.

There is therefore provided in accordance with the invention, a method of browsing multiple electronic catalogs of products from a plurality of merchants, said method comprising receiving from each merchant a product feed that includes data related to products in a merchant's catalog, storing item data received from each merchant in a product database, and providing to a user the ability to browse and search products in said product database.

There is also provided in accordance with the invention, a method of browsing multiple electronic catalogs of products from a plurality of merchants, said method comprising receiving from each merchant a product feed that includes data related to products in a merchant's catalog, converting said product data received from each merchant into a uniform format, storing said formatted product data in a product database, and wherein said product database is accessed in response to requests generated by a user for product data.

There is further provided in accordance with the invention, a method of browsing multiple electronic catalogs of products from a plurality of merchants, said method comprising receiving a request from a user for information about one or more products in one of a plurality of electronic catalogs, each electronic catalog generated from product feeds received from a plurality of merchants and stored in a product database, in response to said request, retrieving data corresponding to said requested one or more products from said product database, and serving said requested data to said user.

There is also provided in accordance with the invention, a method of browsing multiple electronic catalogs of products from a plurality of merchants, said method comprising providing a user multiple browsing options for viewing an electronic catalog of products, said product catalog generated from product data feeds received from a plurality of merchants and stored in a product database on a server, in response to a user request to view catalog items, sending a request to said server for product data corresponding to said requested catalog items, in response to said request, receiving from said server product data corresponding to said requested catalog items, and displaying product data corresponding to said requested catalog items to said user.

There is further provided in accordance with the invention, a system for browsing multiple electronic catalogs of products from a plurality of merchants, comprising a product database for storing data related to products in a merchant's catalog, a server computer operative to receive a product feed from multiple merchants and generate electronic catalogs therefrom stored in said product database, and said server computer incorporating a web-based interface and operative to access said product database in response to requests for product data received from users over a network and to serve product pages generated from product data retrieved from said product database to said users.

There is also provided in accordance with the invention, a computer program product for browsing multiple electronic catalogs of products from a plurality of merchants, the computer program product comprising a non-transitory computer usable storage medium having computer usable code embodied therewith, the computer usable program code comprising, computer usable code configured for receiving from each merchant a product feed that includes data related to products in a merchant's catalog, computer usable code configured for storing item data received from each merchant in a product database, and computer usable code configured for providing to a user the ability to browse and search products in said product database.

BRIEF DESCRIPTION OF THE DRAWINGS

The invention is herein described, by way of example only, with reference to the accompanying drawings, wherein:

FIG. 6 is a diagram illustrating the department page of an example electronic catalog system;

DETAILED DESCRIPTION OF THE INVENTION

Figure 1:
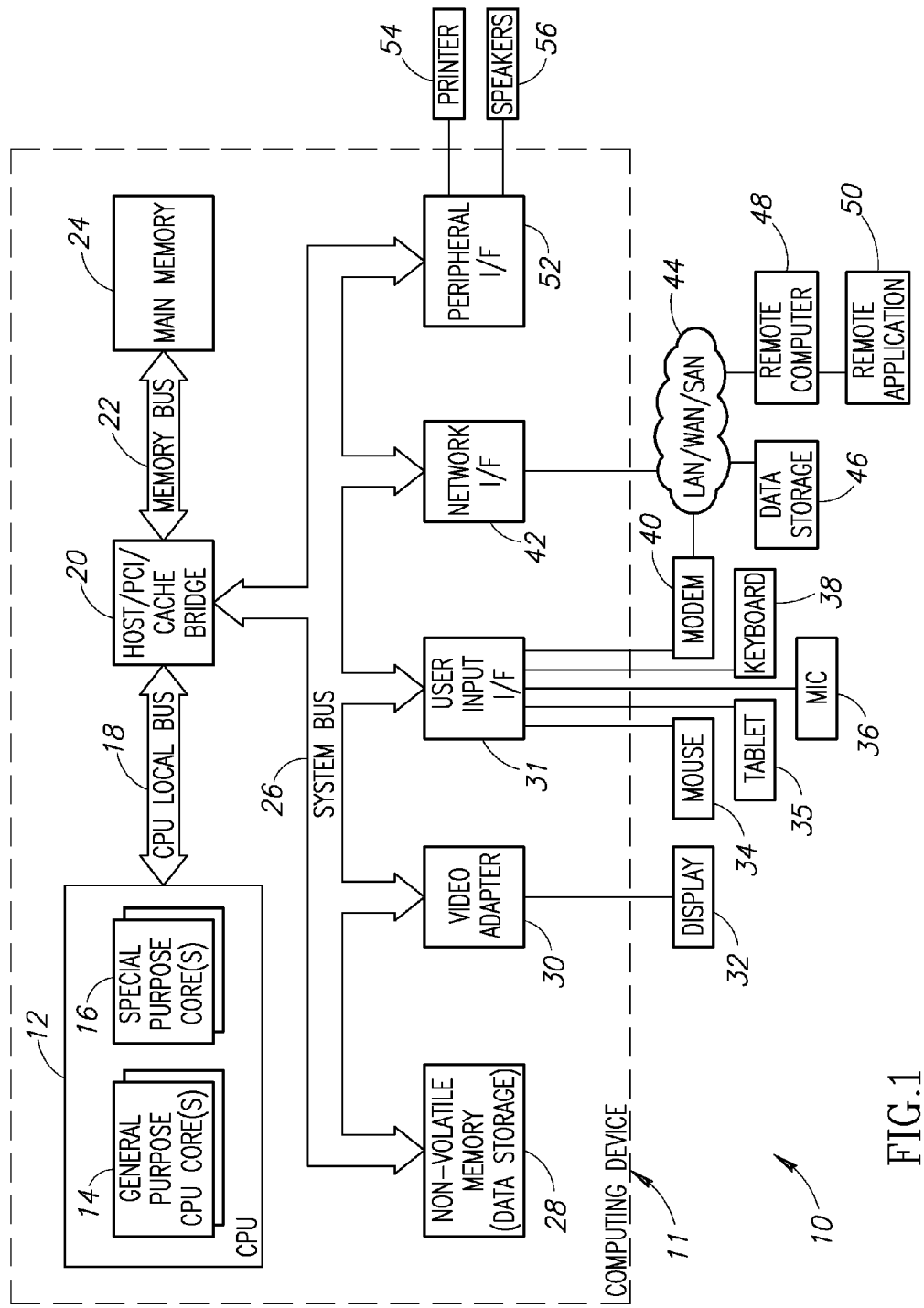
FIG. 1 is a block diagram illustrating an example computer processing system adapted to implement the electronic catalog system of the present invention.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

A block diagram illustrating an example computer processing system adapted to implement the electronic catalog system of the present invention is shown in FIG. 1. The exemplary computer processing system, generally referenced 10, for implementing the invention comprises a general purpose computing device 11. Computing device 11 comprises central processing unit (CPU) 12, host/PIC/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores executes functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, non-volatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Tablet/Mobile Device Incorporating the Electronic Catalog System

Figure 2:
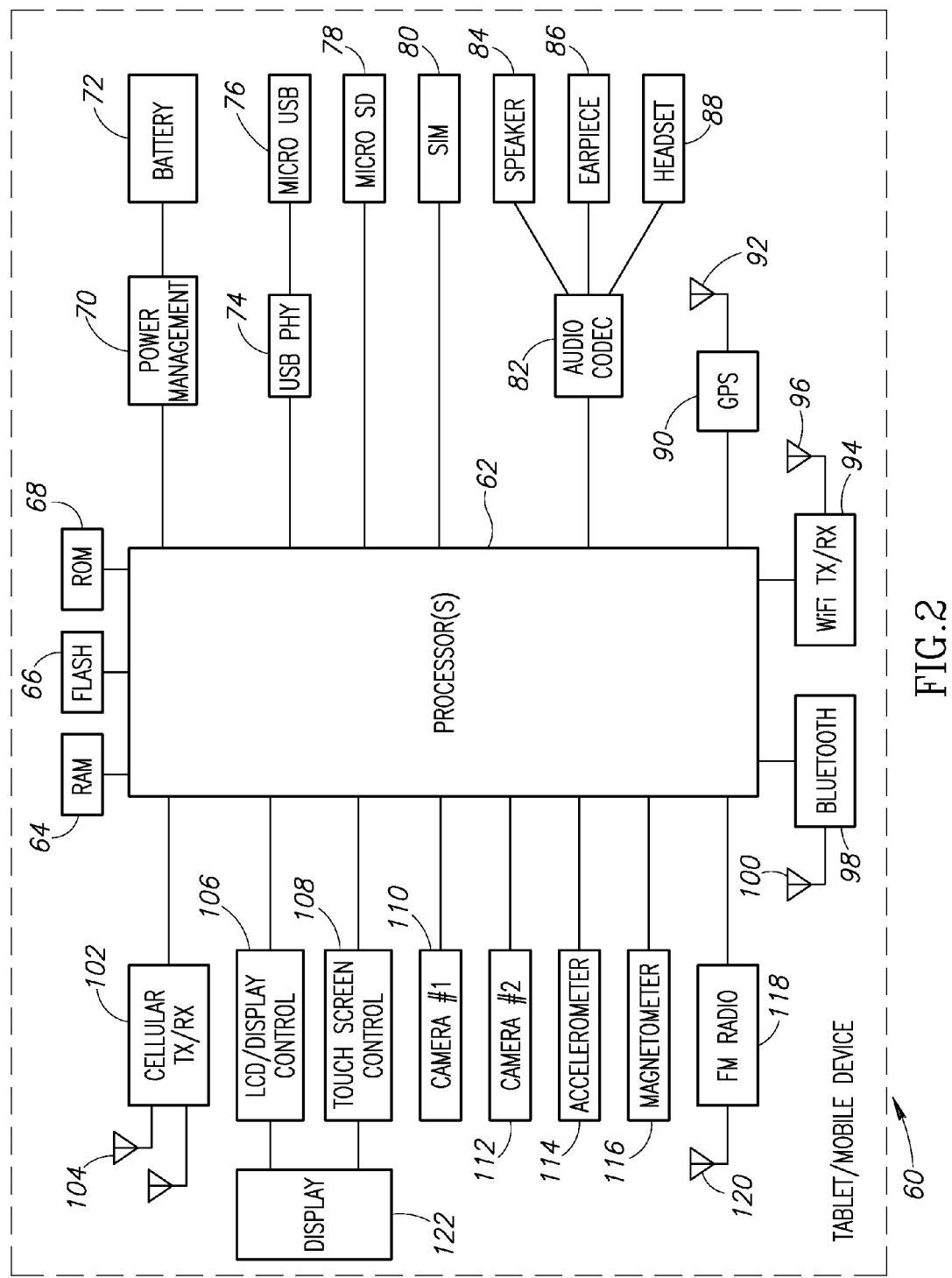
FIG. 2 is a high level block diagram illustrating an example tablet/mobile device incorporating the electronic catalog system of the present invention.

A high level block diagram illustrating an example tablet/mobile device incorporating the electronic catalog system of the present invention is shown in FIG. 2. The mobile device is preferably a two-way communication device having voice and/or data communication capabilities. In addition, the device optionally has the capability to communicate with other computer systems via the Internet. Note that the mobile device may comprise any suitable wired or wireless device such as multimedia player, mobile communication device, cellular phone, smartphone, PDA, PNA, Bluetooth device, tablet computing device such as the iPad, etc. For illustration purposes only, the device is shown as a mobile device, such as a cellular based telephone, smartphone or superphone. Note that this example is not intended to limit the scope of the mechanism as the invention can be implemented in a wide variety of communication devices. It is further appreciated the mobile device shown is intentionally simplified to illustrate only certain components, as the mobile device may comprise other components and subsystems beyond those shown.

The mobile device, generally referenced 60, comprises one or more processors 62 which may comprise a baseband processor, CPU, microprocessor, DSP, etc., optionally having both analog and digital portions. The mobile device may comprise a plurality of cellular radios 102 and associated antennas 104. Radios for the basic cellular link and any number of other wireless standards and Radio Access Technologies (RATs) may be included. Examples include, but are not limited to, Code Division Multiple Access (CDMA), Personal Communication Services (PCS), Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc.

The mobile device may also comprise internal volatile storage 64 (e.g., RAM) and persistent storage 68 (e.g., ROM) and flash memory 66. Persistent storage 68 also stores applications executable by processor(s) 62 including the related data files used by those applications to allow device 60 to perform its intended functions. Several optional user-interface devices include trackball/thumbwheel which may comprise a depressible thumbwheel/trackball that is used for navigation, selection of menu choices and confirmation of action, keypad/keyboard such as arranged in QWERTY fashion for entering alphanumeric data and a numeric keypad for entering dialing digits and for other controls and inputs (the keyboard may also contain symbol, function and command keys such as a phone send/end key, a menu key and an escape key), headset 88, earpiece 86 and/or speaker 84, microphone(s) and associated audio codec or other multimedia codecs, vibrator for alerting a user, one or more cameras and related circuitry 110, 112, display(s) 122 and associated display controller 106 and touchscreen control 108. Serial ports include a micro USB port 76 and related USB PHY 74 and micro SD port 78. Other interface connections may include SPI, SDIO, PCI, USD, etc. for providing a serial link to a user's PC or other device. SIM/RUIM card 80 provides the interface to a user's SIM or RUIM card for storing user data such as address book entries, user identification, etc.

Portable power is provided by the battery 72 coupled to power management circuitry 70. External power is provided via USB power or an AC/DC adapter connected to the power management circuitry which is operative to manage the charging and discharging of the battery. In addition to a battery and AC/DC external power source, additional optional power sources each with its own power limitations, include: a speaker phone, DC/DC power source, and any bus powered power source (e.g., USB device in bus powered mode).

Operating system software executed by the processor 62 is preferably stored in persistent storage (i.e. ROM 68), or flash memory 66, but may be stored in other types of memory devices. In addition, system software, specific device applications, or parts thereof, may be temporarily loaded into volatile storage 64, such as random access memory (RAM). Communications signals received by the mobile device may also be stored in the RAM.

The processor 62, in addition to its operating system functions, enables execution of software applications on the device 60. A predetermined set of applications that control basic device operations, such as data and voice communications, may be installed during manufacture. Additional applications (or apps) may be downloaded from the Internet and installed in memory for execution on the processor. Alternatively, software may be downloaded via any other suitable protocol, such as SDIO, USB, network server, etc.

Other components of the mobile device include an accelerometer 114 for detecting motion and orientation of the device, magnetometer 116 for detecting the earth's magnetic field, FM radio 118 and antenna 120, Bluetooth radio 98 and antenna 100, Wi-Fi radio 94 including antenna 96 and GPS 90 and antenna 92.

In accordance with the invention, the mobile device 60 is adapted to implement the electronic catalog system as hardware, software or as a combination of hardware and software. In one embodiment, implemented as a software task, the program code operative to implement the electronic catalog system is executed as one or more tasks running on processor 62 and either (1) stored in one or more memories 64, 66, 68 or (2) stored in local memory within the processor 62 itself.

Electronic Catalog System

Figure 3:
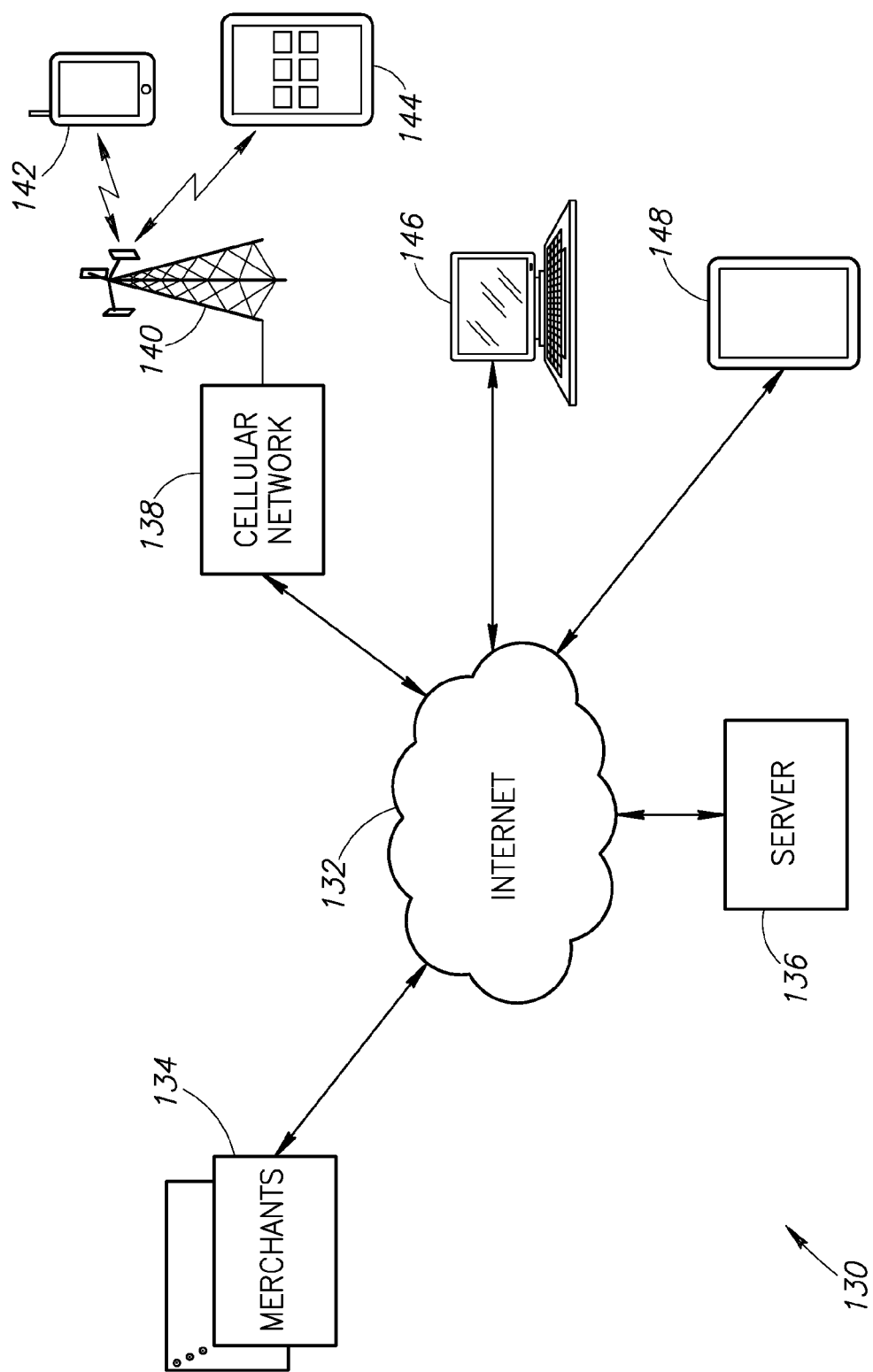
FIG. 3 is a block diagram illustrating an example network that includes merchants, server and users.

A block diagram illustrating an example network that includes merchants, server and users is shown in FIG. 3. The network, generally referenced 130, comprises a server 136 and a plurality of merchants 134 connected to the Internet 132 or other wide area network. Users communicate with the server via the Internet and may comprise several devices such as a tablet (e.g., iPad, etc.) 148 connected via Wi-Fi or through a cellular connection, desktop/laptop (via wired or wireless connection) computer 146, mobile device 142 such as a smartphone or cellular enabled wireless tablet 144 both in communication with the server and merchants via cellular network 138 (e.g., G3, G4, etc.) including base stations 140.

The electronic catalog system provides the capability of producing and viewing catalogs without the use of traditional paper and ink methods. The system is intended for use on any computer system such as desktop computers, laptop computers, notebook computers, netbook computers, wireless mobile devices, mobile phones, etc. It is however, especially applicable for use on tablet computers such as the Apple iPad, Android based tablets and other tablet formats.

The electronic catalog system comprises a pre-processing mode and a post-processing mode which precedes an operational use mode. The system comprises software that runs on one or more server computers as well as client or user side that can be realized (1) as a standalone software application or "app" that runs on the user device (e.g., desktop, mobile device, tablet, etc.) or (2) entirely in a standard web browser. Essentially, the electronic catalog system emulates the portability and usability of a traditional paper and ink catalog, especially when realized on a tablet or mobile device.

The system is fully portable in a form factor that simulates a printed catalog. All product data is provided by one or more specified data feeds that automatically update the contents of the electronic catalogs. The software emulates the functionality and physical use of a printed catalog, such as natural page turning or page sliding motions, written product description, vivid pictures and legible printing. The catalog pages can also link to other relevant merchant website pages.

An advantage of the system is that it can be used anywhere a wireless Internet connection or mobile phone signal is available as well as on a desktop computer via a standard web browser. The user interface provided to the user (whether standalone application or through a web browser) can be used by anyone without computer or software knowledge as its operation intuitively simulates the use of a commonly used item, i.e. a printed-paper catalog.

Throughout this document the term "website" is used to refer to a user-accessible network site that implements the basic World Wide Web standards for the coding and transmission of hypertext documents. These standards currently include HTML (the hypertext mark up language) and HTTP (the hypertext transfer protocol). Note that the term "site" is not intended to imply a single geographic location as a website or other network site can, for example, include multiple geographically distributed computer systems that are appropriately linked together.

Figure 4:
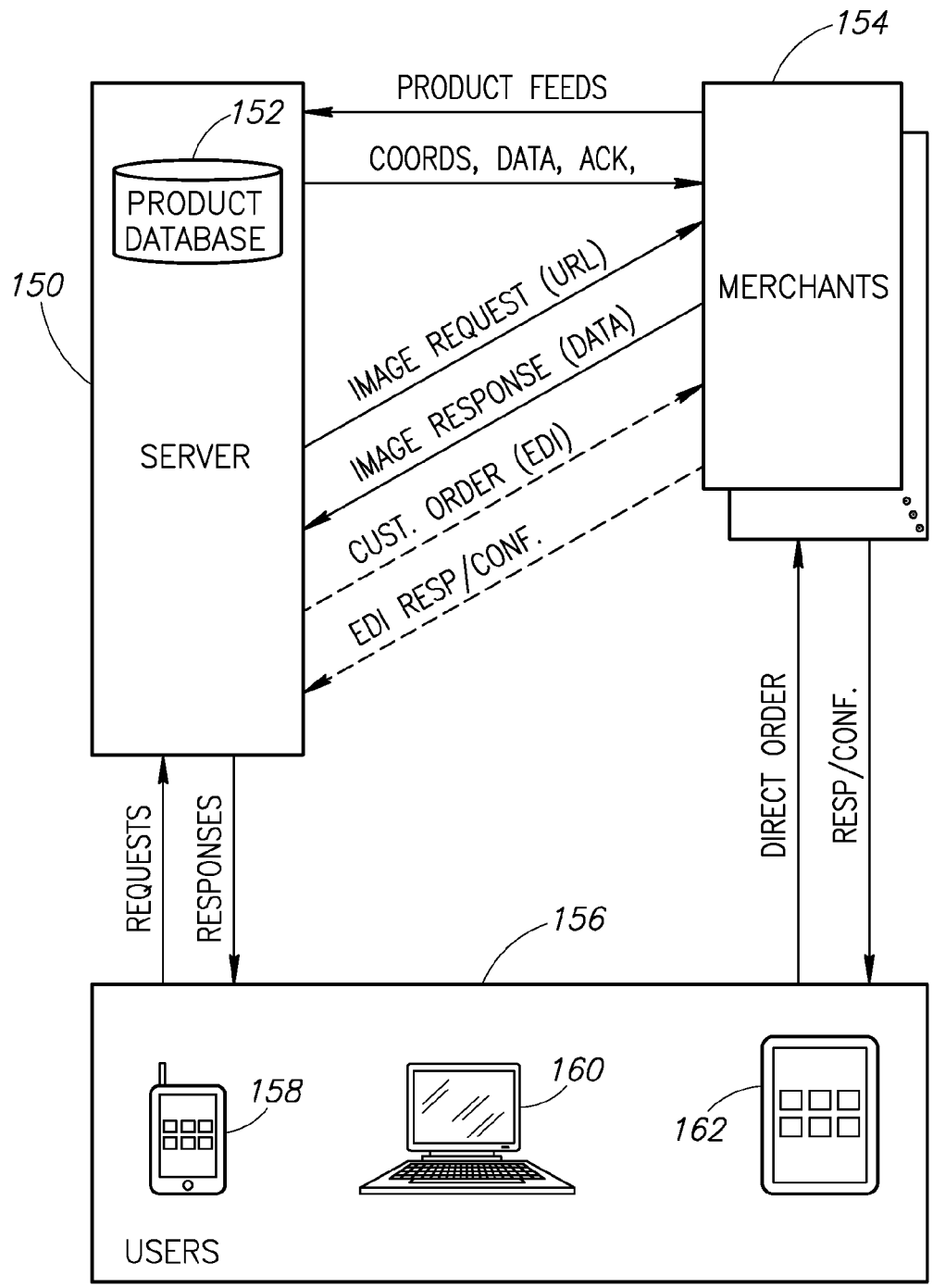
FIG. 4 is a block diagram illustrating an example network showing the data flow between the server, users and merchants.

A block diagram illustrating an example network showing the data flow between the server, users and merchants is shown in FIG. 4. In operation, merchants 154 provide a product feed of their catalog items which is read by the server 150 and stored in a product database 152. During a feed processing stage, the server requests products images from the merchants site and caches the images in the product database.

Users 156 browse the electronic catalogs stored on the server by sending requests for data and receiving responses containing the requested data. In one embodiment, in response to user requests, the server generates pages which are then served to the user's device and displayed. User devices may comprise numerous types of devices and include, but are not limited to, mobile devices 158, desktops, laptops, notebooks, netbooks, etc. 160 and table devices 162. The user may connect to the server via a standalone software application or via a standard web browser.

A request for more detailed information or to buy a product by a user generates a request or direct order to a merchant. Orders may be transacted directly between the user and the merchant or optionally through the server and Catalogs.com website, for example.

Example Screen Images

Each merchant catalog comprises a series of pages. In some mediums, the system can be viewed in portrait mode (which consists of a single page view), or landscape mode (which displays a dual page view). Each page displays a plurality of products depending on the available screen real estate. Product displays are in one of multiple sizes. Each size has several styles comprising a page layout, background colors/patterns and designs. In one embodiment, page layouts are governed by a rotation of definitions that dictate product number and size. This fixed rotation provides both variations for the visitor and structure for the system, enabling it to locate the exact page and layout position of any product in any catalog at any time. Visitors can move from page to page by sliding or clicking navigation buttons on the screen in a simulated "real catalog" experience. Page numbers are displayed on each page and can be touched (the physical act of pressing on the image on the tablet computer's screen) which provides a functional way to jump from any page to another page in the catalog.

Figure 5:
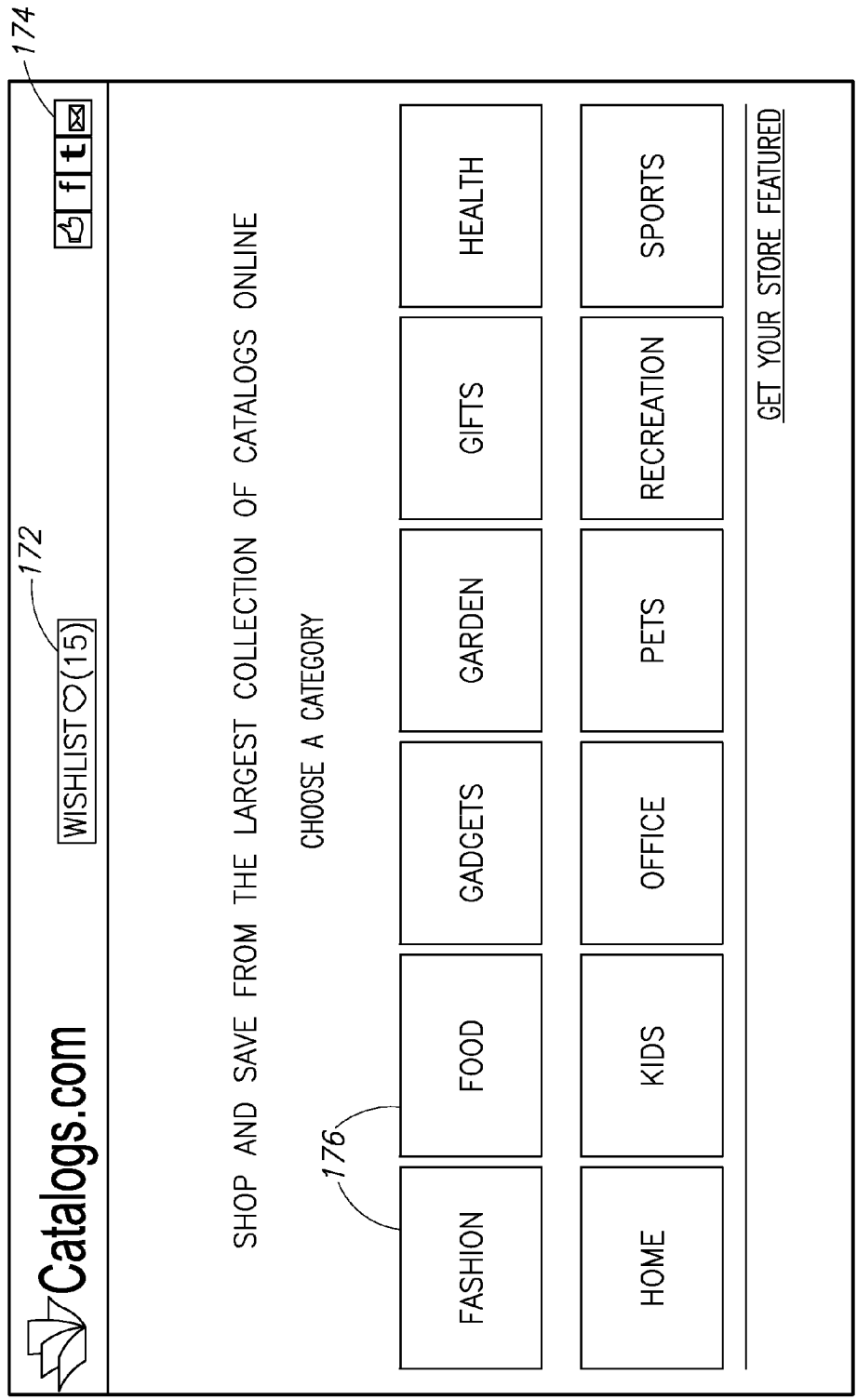
FIG. 5 is a diagram illustrating the home page of an example electronic catalog system.

A diagram illustrating the home page of an example electronic catalog system is shown in FIG. 5. The home page, generally referenced 170, displays a plurality of department hyperlinks 176 each including text and related image. A user can touch or click a category icon to see the catalogs in that particular department. Also shown is a wish list link 172 which causes the wish list page to be displayed. One or more social networking icons 174 are displayed in the upper right corner allowing a user to share the particular page with others.

Figure 6:
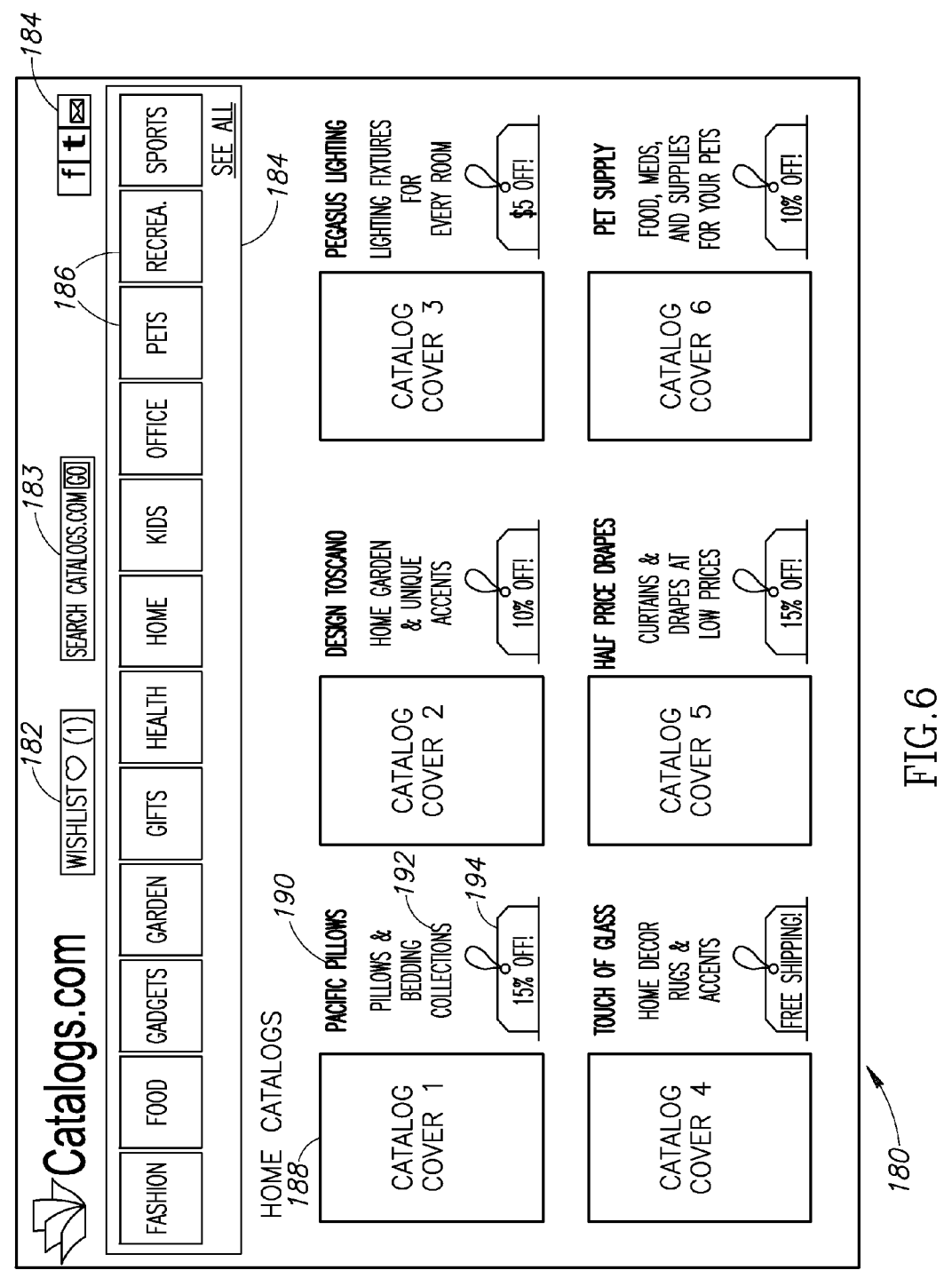

A diagram illustrating the department page of an example electronic catalog system is shown in FIG. 6. The department page, generally referenced 180, is displayed with a user touches or clicks on a department icon on the home page. At the top of the department page is a wish list link 182, search link 183 which does a search across all catalogs and one or more social media/email icons 184. In this example, the Home Catalogs category page is displayed. Users can navigate to other catalog categories 186 by sliding the department toolbar 187.

The department page also displays a plurality of products each including a catalog cover image 188, catalog title 190, short description of the items in the catalog 192 and any special offers 194 such as discounts, free shipping, etc. which if touched/clicked pop up with additional information. To enter a specific catalog, a user simply touches/clicks a catalog cover 188. Sliding up or down on the page allows additional catalogs to be displayed.

Each merchant's catalog is divided into Contents categories according to definitions provided in the product feed received from the merchant (when provided). Each category can be viewed individually and can act as a mini-catalog. Category specific catalogs use the same page layout and navigation methodologies and systems as regular catalogs. Where categories are provided, the user is presented with a list and can navigate between the main catalog and category specific catalogs. Merchants can also specify unique cover images specific to particular categories, effectively producing a mini-catalog that can be used for targeted product marketing. The unique category groupings are drawn from the main data feed which comprises the entire catalog.

Figure 7:
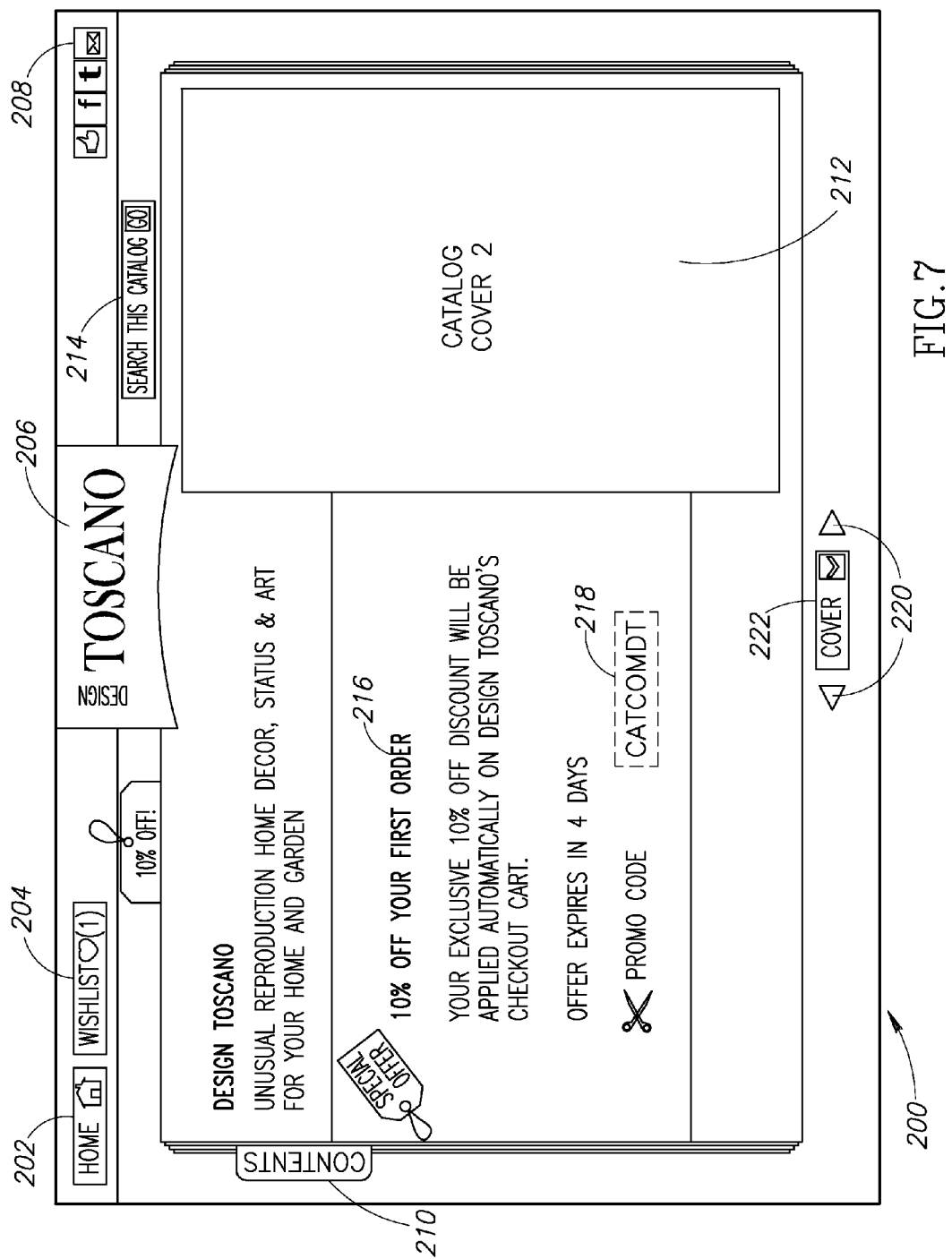
FIG. 7 is a diagram illustrating a sample catalog cover page of an example electronic catalog system.

A diagram illustrating a sample catalog cover page of an example electronic catalog system is shown in FIG. 7. The specific catalog cover page, generally referenced 200, comprises a home hyperlink 202, wish list link 204, catalog title link 206, social media buttons 208 and catalog search box 214. Touching/clicking Home 202 takes the user back to the Homepage or to a selected department page. Touching/clicking the wish list 204 takes the user to a personal wish list page of multiple products. Touching/clicking the catalog title 206 brings up an expanded description of the merchant and the types of products the catalog sells.

The catalog cover 212 is displayed on the page alongside any special offers 216 from the merchant. The special offers are highlighted on the first page of the electronic catalog. In this example, a promo code 218 is presented to obtain the discount on the first order. A contents tab 210 displays the contents of the catalog when touched/clicked. Users can directly jump to any page in the catalog by touching/clicking the forward and back arrows 220 or by touching/clicking and selecting the desired page in the page jump window 222. On the tablet version of the application software, users can navigate the catalog by sliding catalog pages back and forth. Note that merchants have the ability to change their cover images at any time using a Merchant Services Portal.

Through the search box displayed at the top of the page, users can search for a word or phrase and be returned a list of products matching their criteria. These products may be presented in catalog form, a traditional list form, or a sliding bar that contains thumbnail images of the products that match the user's search criteria. The search is context sensitive and can be either site wide (across all catalogs) or catalog specific. Alternatively, the user is given a choice as to the scope of the search. Products can be further filtered by manufacturer, price, size and availability, colors, sizes, popularity, relevance, additional options, discount offers, etc.

The search model has an active search component, which finds products similar to the one being searched for and adds it to the search list. The searches are system multi-catalog wide, so as the user searches for products, the search results returned can be from any catalog with items that match the attributes of the item being searched for. Search criteria can be specified for any component of the product database including plain English description search, price, size, color or other product features. Additional products can also be presented to the user based on their previous search or shopping behaviors.

Figure 8:
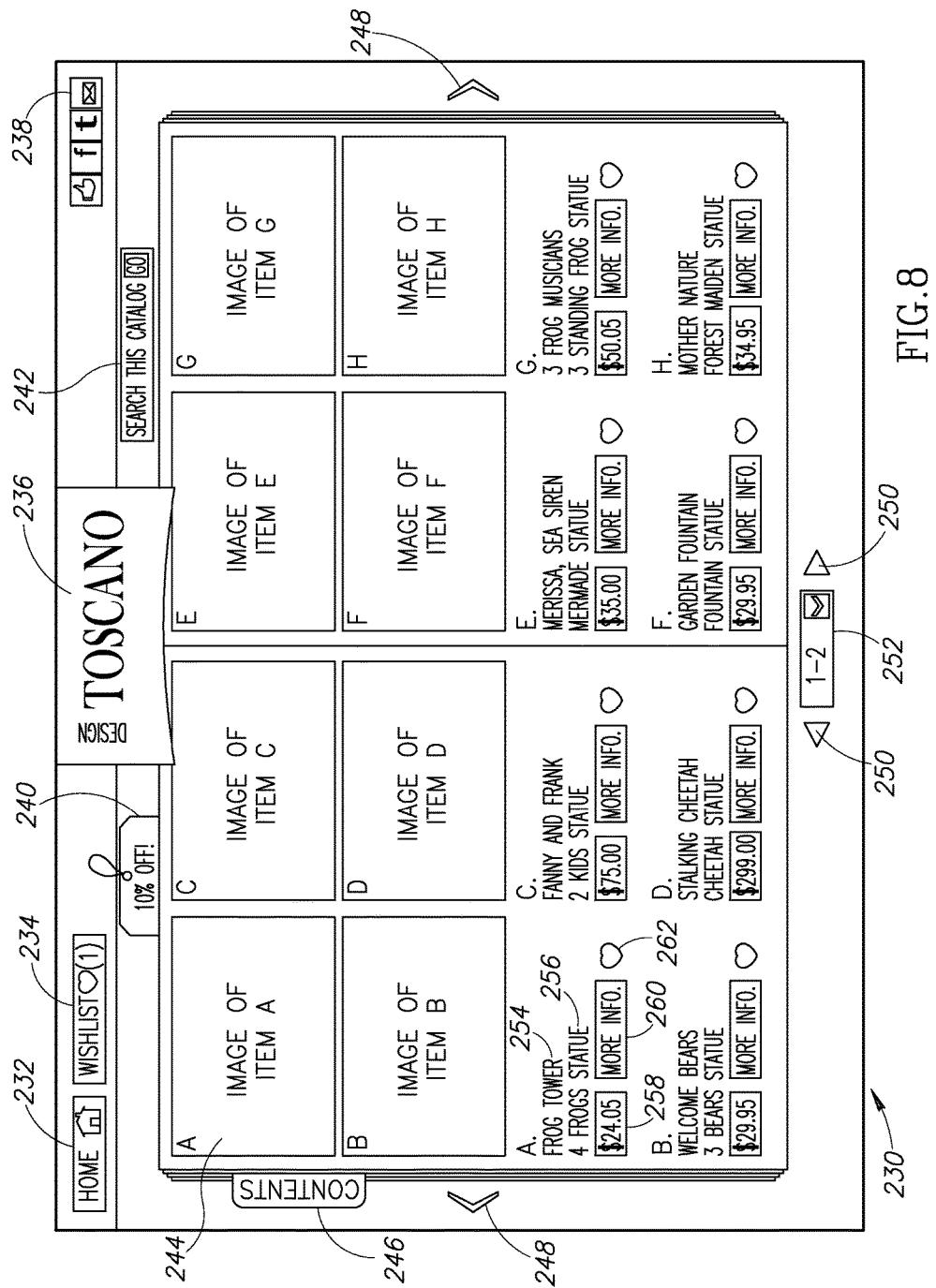
FIG. 8 is a diagram illustrating sample interior pages of an example electronic catalog system.

A diagram illustrating sample interior pages of an example electronic catalog system is shown in FIG. 8. The catalog interior pages, generally referenced 230, displays the interior page content of the electronic catalog. At the top of the page are displayed a home link 232 to take the user back to the Home page or to a selected department, wish list link 234 to take the user to a personal wish list page, catalog title 236 to display an expanded description of the merchant and what the catalog sells, a search box 242 to allow the user to find products in the catalog by keyword and social networking/email buttons to allow users to share the catalog with others.

A special offer icon 240 expands into a modal window to show the details of the special offer when touched/clicked. Contents tab 246 provides a table of contents of the catalog. The catalog items are displayed (e.g., eight on the example page shown), where each item displays the product image 244, product name 254, product description 256, price 258, a link for more information 260 and a wish list heart icon 262. Note that the product images, prices, descriptions, etc. are populated from the products database. Merchants can update the contents of this database via a Merchant Services Portal.

Touching/clicking the more info. Link 260 or the product image displays an expanded and more detailed product description including a larger image. Touching/clicking the heart icon 262 adds the product selected to the user's wish list. Users can jump to another page in the catalog by touching/clicking the forward and back arrows 250 or clicking the jump window 252. Desktop users can turn pages of the catalog by clicking on the left and right navigation arrows 248. Tablet (e.g., iPad) users navigate the catalog by sliding catalog pages back and forth.

Figure 9:
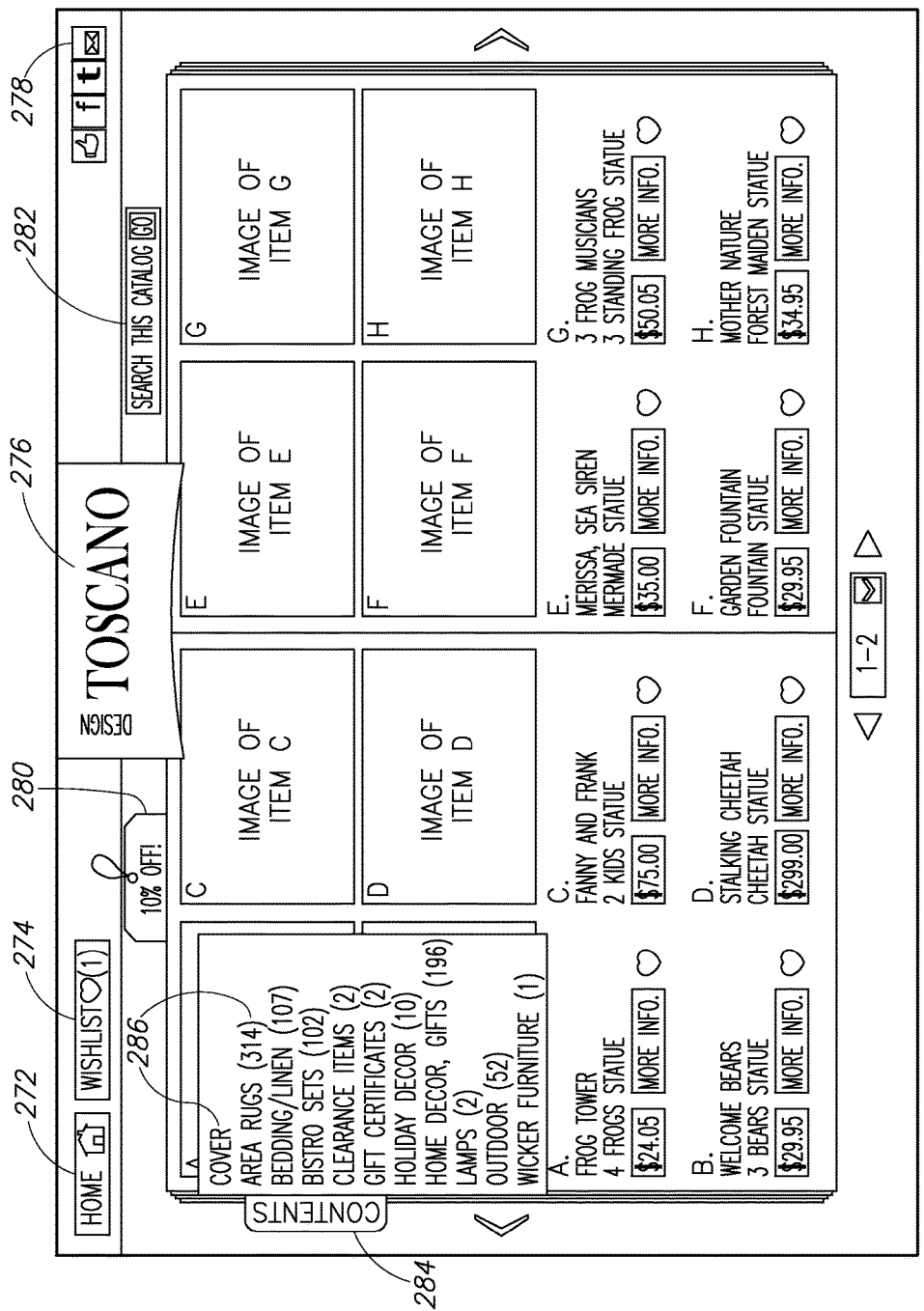
FIG. 9 is a diagram illustrating specific interior pages of an example electronic catalog system.

A diagram illustrating specific interior pages of an example electronic catalog system is shown in FIG. 9. The specific catalog interior page, generally referenced 270, displays product information about multiple items in the catalog. At the top are displayed a home button 272, wish list button 274, catalog title button 276, search this catalog box 282, social networking/email buttons 278 and special offer icon 280. The contents tab 284, when touched/clicked, displays the table of contents of the catalog. The table of contents are listed by categories and any number of subcategories 286 along with an indication of the number of products in that category or sub-category.

Figure 10:
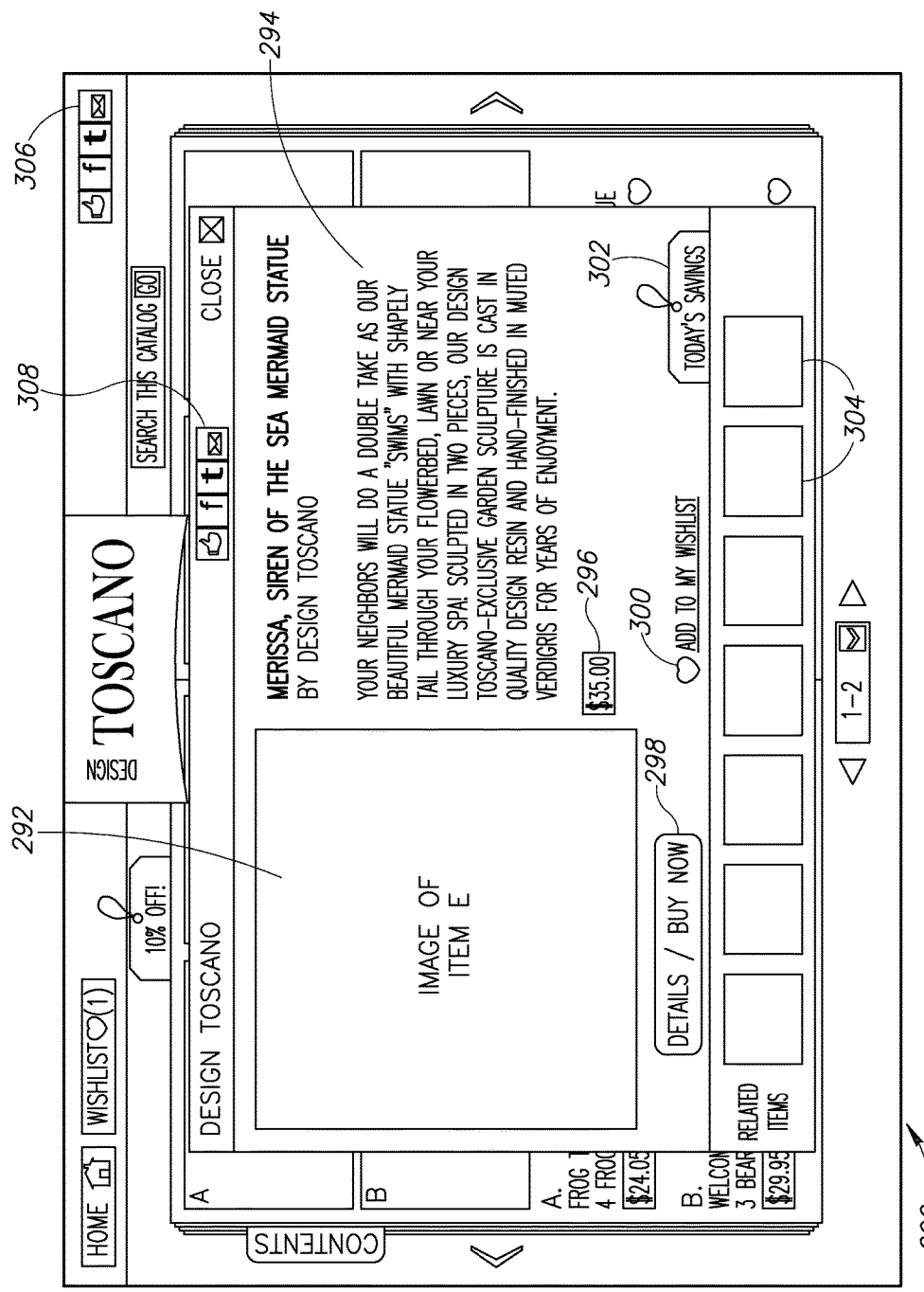
FIG. 10 is a diagram illustrating a product detail modal window of an example electronic catalog system.

A diagram illustrating a product detail modal window of an example electronic catalog system is shown in FIG. 10. The product detail modal window, generally referenced 290, is displayed with a user touches/clicks on either the product image or the "More Info." button on interior product pages. This page displays an expanded version of the product image 292 and a detailed description 294. The detailed product description 294 is provided by the product database and updated by the merchant via the Merchant Services Portal. In addition, several other options are displayed. The price 296 as provided by the product database and updated by the merchant via the Merchant Services Portal. Special offers 302 when touched or clicked expand in a modal window to show the details of the special offer. Related products 304 are recommended and displayed whereby products related to or similar to the one currently selected are automatically searched for and displayed. Note that the related products may be from the same catalog as the one being viewed or from other merchant catalogs. The "Details/Buy Now" button 298, when touched or clicked, in one embodiment, takes the user to the product page on the merchant's website to provide the user more details about the product and the ability to purchase it. A wish list heart icon 300, social networking/email buttons 306 (to share the catalog with others) and social networking/email buttons 308 (to share the product with others) are also displayed.

The "Share" function is an option that allows the user to share their entire wish list or individual catalog products with other users via e-mail, Facebook, Twitter, Google+1 and other social networking websites. A "subscribe" function allows users to opt-in to automatically be notified and receive electronic updates of the merchant's catalogs, special offers, new products, updates to the "App" or other notifications that the merchant can distribute to the user at a later time.

Note that each product in the full catalog, category specific catalog, wish list or search result list includes a "More Info" icon. Clicking/touching this icon causes a modal window to appear with a larger product image and broader product description. Also appearing in the modal window are other products that are related to the main product the user is viewing.

Related products can be from the current catalog being viewed or from all similar products across all of the catalogs in the database. Any of these related products can be viewed by clicking/touching the thumbnail image of the related product, which causes a larger image and description of the related product to appear in this modal window. Related products are determined based upon similar relevance to products searched for in the Product Search keyword box. Also, related products can be presented based on the user's previous search or shopping behaviors.

Figure 11:
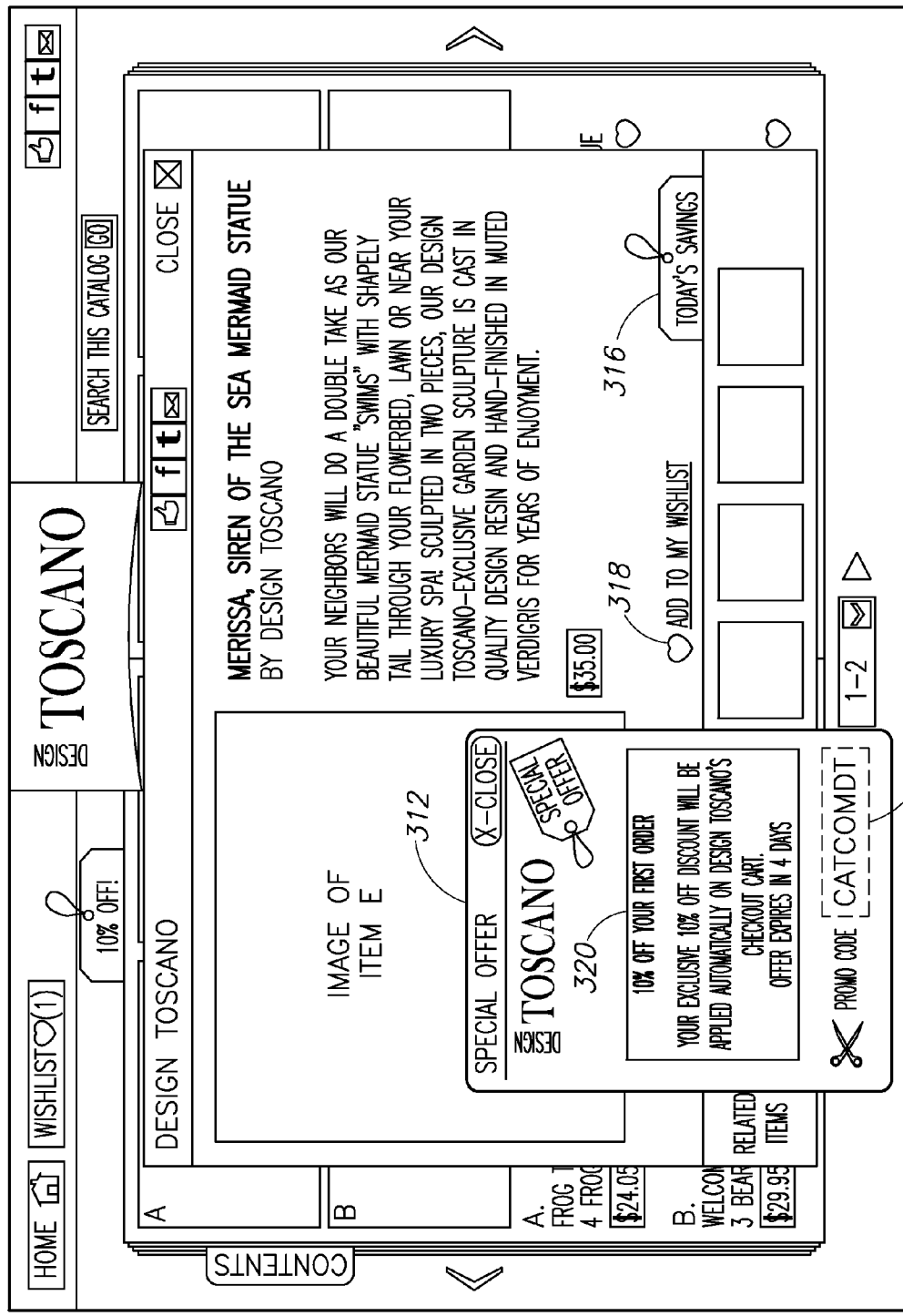
FIG. 11 is a diagram illustrating sample special offer display of an example electronic catalog system.

A diagram illustrating sample special offer display of an example electronic catalog system is shown in FIG. 11. The special offer display, generally referenced 310, is presented when a user touches/clicks a special offer button or icon 316. Upon a user touching/clicking "Today's Saving" button 316, an expanded modal window display 312 is presented that shows offer details and redemption instructions 320 in addition to promotion/coupon codes 314.

Each product in a catalog, department specific catalog or search result list includes an "Add to my Wish list" icon. Touching/clicking this icon adds the product to a wish list specific to the user. Users can add multiple products from multiple catalogs to their wish list and access their wish list from any other computer or device. A "My Wish list" button takes the user to a page of their wish listed products.

Products remain on the wish list until individually deleted by the user. Each wish listed product includes a link to "More Info" which when touched/clicked takes the user to the product on the merchant's website, a link back to its parent catalog, a link to the savings offer details and redemption instructions and an option to delete the item from the wish list.

Figure 12:
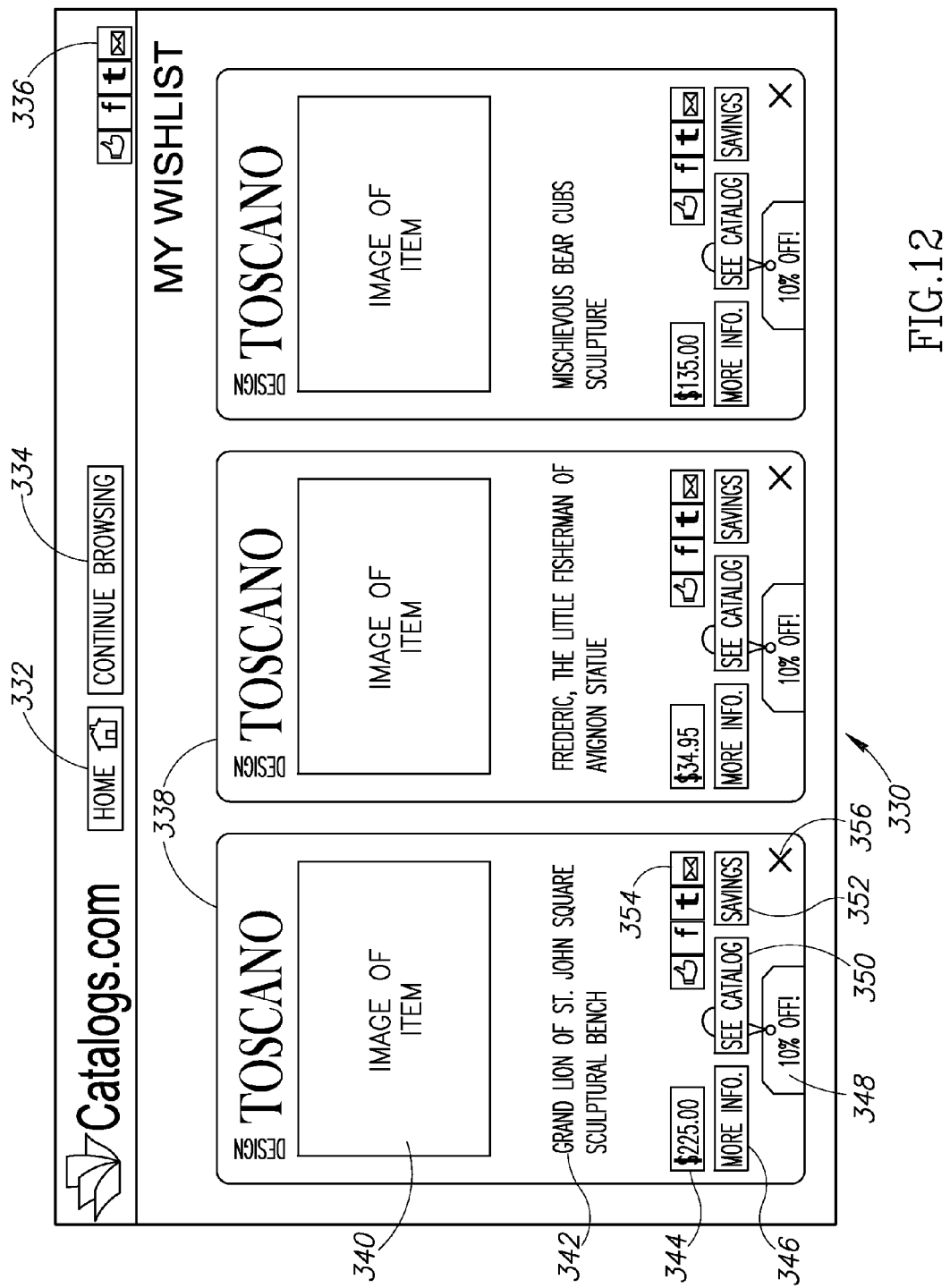
FIG. 12 is a diagram illustrating a sample wish list page of an example electronic catalog system.

A diagram illustrating a sample wish list page of an example electronic catalog system is shown in FIG. 12. The wish list page, generally referenced 330, is displayed whenever a user touches/clicks on the wish list in the upper left portion of display pages next to the Home button. The wish list allows users to 'bookmark' products from different merchant catalogs. Touching/clicking the Home button 332 takes the user back to the Home page or to a selected department page. Touching/clicking the "Continue Browsing" button 334 takes the user back to the product page of the catalog they were in before they touched/clicked the "Wish list" button. The social media/email buttons 336 allow users to login and share all or part of their wish list with others.

Touching or clicking the product image 340 or the "More info" button 346 takes the user to the product page on the merchant's website. The price 344 is displayed along with the product title 342. Special offers 348, 352, when touched/clicked expand in a modal window to show the offer details and redemption details. Touching/clicking the "See in Catalog" button 350 takes the user to the page in the catalog in which the product appears. Social media/email buttons 354 allow users to share that particular product with others. Touching/clicking the 'X' 356 button deletes that product from the user's wish list.

Figure 13:
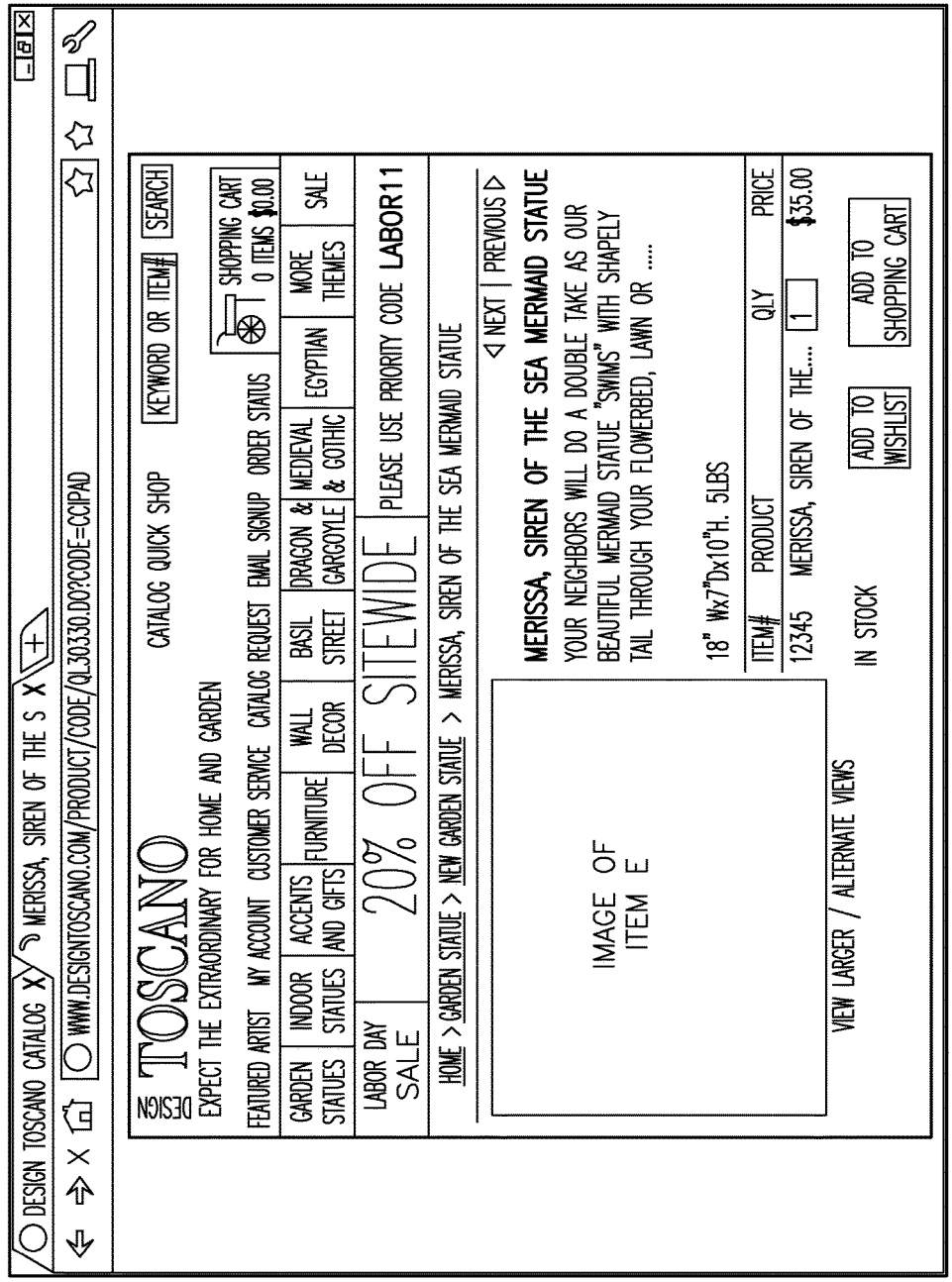
FIG. 13 is a diagram illustrating the transfer of a user to a merchant website product detail page.

A diagram illustrating the transfer of a user to a merchant website product detail page is shown in FIG. 13. Touching/clicking the product image or the "More info." Button in the electronic catalog wish list or the "Display/Buy Now" button on the expanded product page, takes the user directly to the product page on the merchant's own website where they can see more detailed product information and purchase the item. An example merchant website display 360 is shown for one of the products in the electronic catalog.

In particular, the "Details/Buy Now" launches a new browser/modal window (depending on the medium) and takes the user to the merchant's product page on the merchant's website. In this case, the user continues by interacting directly with the merchant's website to make further selections (e.g., color, size, etc.) and finally order the particular item (place the item in the merchant's shopping cart).

Figure 14:
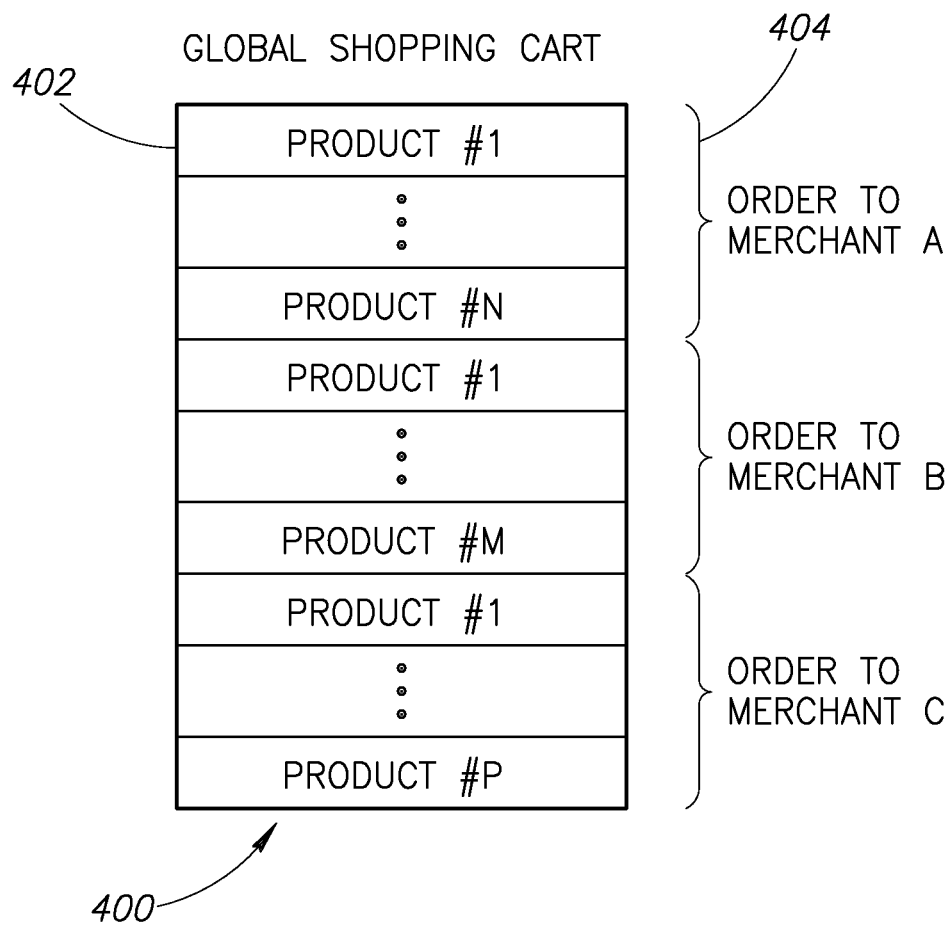
FIG. 14 is a diagram illustrating an example global shopping cart table.

In one embodiment, the electronic catalog system comprises a global shopping cart wherein users can place orders for products as they are browsing through merchant catalogs. The global shopping cart can contain products from across all merchant catalogs. A diagram illustrating an example global shopping cart table is shown in FIG. 14. The shopping cart table, generally referenced 400, comprises a plurality of records 402 sorted by merchant. For example, products 1 through N make up an order 404 for merchant A; products 1 through M are an order for merchant B; and products 1 through P are an order for merchant C.

Alternatively, the system comprises a global shopping cart where items across many catalogs can be ordered. In this case, as shown in FIG. 6, once the user is finished shopping, the various orders are sorted by merchant, and the separate orders are placed with the individual merchants using an appropriate protocol such as EDI (dashed arrows in FIG. 2). In this case, the shopping cart is maintained on server B.

In the "global shopping cart" embodiment, users collect products from any of the merchant catalogs making up the system and make their purchase without being sent to the individual merchant sites. This requires participating merchants to supply any additional information necessary to uniquely identify a product like size or color in their feeds. A backend infrastructure parses and delivers orders to the appropriate merchants as well as aggregating shipping and processing feedback so that it can be delivered comprehensively to the customer (user). Alternatively, all of the orders can be stored per each respective merchant and then populate the selected merchant's carts on the merchant's own website when the user is ready to check out.

The checkout of items in the shopping cart can be implemented wherein the products are segmented and sorted into groups, each group associated with one merchant. All products associated with a merchant are forwarded to the merchant's e-commerce website for completing the transaction with the user. Thus, each order containing a group of products from one of the merchants is handled together on the merchant website. In this case, the user receives separate order confirmations and receipts from each of the merchants.

Merchant Subscription

In operation, merchants subscribe to have their catalogs created and hosted on the electronic catalog emulation service. Service fees are collected from merchants on a periodic basis (e.g., weekly, monthly, annually, etc.). Alternatively, fees may be levied on a revenue sharing basis calculated as a percentage of the merchant's sales to users generated from the service.

Links to the merchant's main catalog or mini-catalogs hosted on the product database server can be placed on the merchant's own site pages, Facebook pages, or used in e-mails. This essentially provides the merchant with complete portability of their own electronic catalogs that are maintained by the systems software and servers with no burden on the merchant's side except to update the product feed when necessary with price changes, updated images, new products, etc. The hosted electronic catalogs can also be displayed on the merchant's website in "frames" that mimic the merchant site look and feel to permit the user to have experience of always being on the merchant's site when viewing the catalog.

Note that in one embodiment, all product URL's leading back to the merchant's website have a tracking component appended to them to allow the merchant to keep track of the number of visitors, page views and sales being generated by their electronic catalog. These electronic catalogs can also be converted into their own stand alone "apps" for distribution in tablet and mobile phone and app stores.

A Merchant Services Portal allows merchants to enter and perform various catalog related tasks. For example, the portal give merchants the ability to manipulate their product feed, change cover and logo graphics, change savings offers, change backgrounds, change product ordering, see catalog analytics, manipulate link tracking, set up mini-catalogs, pay for services, access account and billing information, etc.

User Membership

In one embodiment, users have the opportunity to create an account with a login and password that allows them to permanently archive their preferences and history across all platforms. Preferences could be items like favorite topics, wish lists, order history, ratings, etc. Using their login, users can access their saved preferences (e.g., account settings, photographs, add products to their account, etc.), save wish lists, append notes to selected wish listed products, vote or comment on products catalogs or other wish lists, and other personal catalog related action) from any device or application on any computer, including but not limited to personal desktop computer, tablet computers, mobile devices, smartphones etc., public computers like those found in libraries or public Internet kiosks. Stored membership preferences will allow merchants to deliver a more robust message to their customers with targeted products, updates, and time sensitive special offers.

In addition membership allows users to communicate, share recommendations and review other user wish lists within the membership community, further enhancing their shopping experience. The system can also convert any electronic catalog into a PDF for the purpose of printing it or saving it to the user's computer hard disk drive or other storage media.

Electronic Catalog Server

Figure 15:
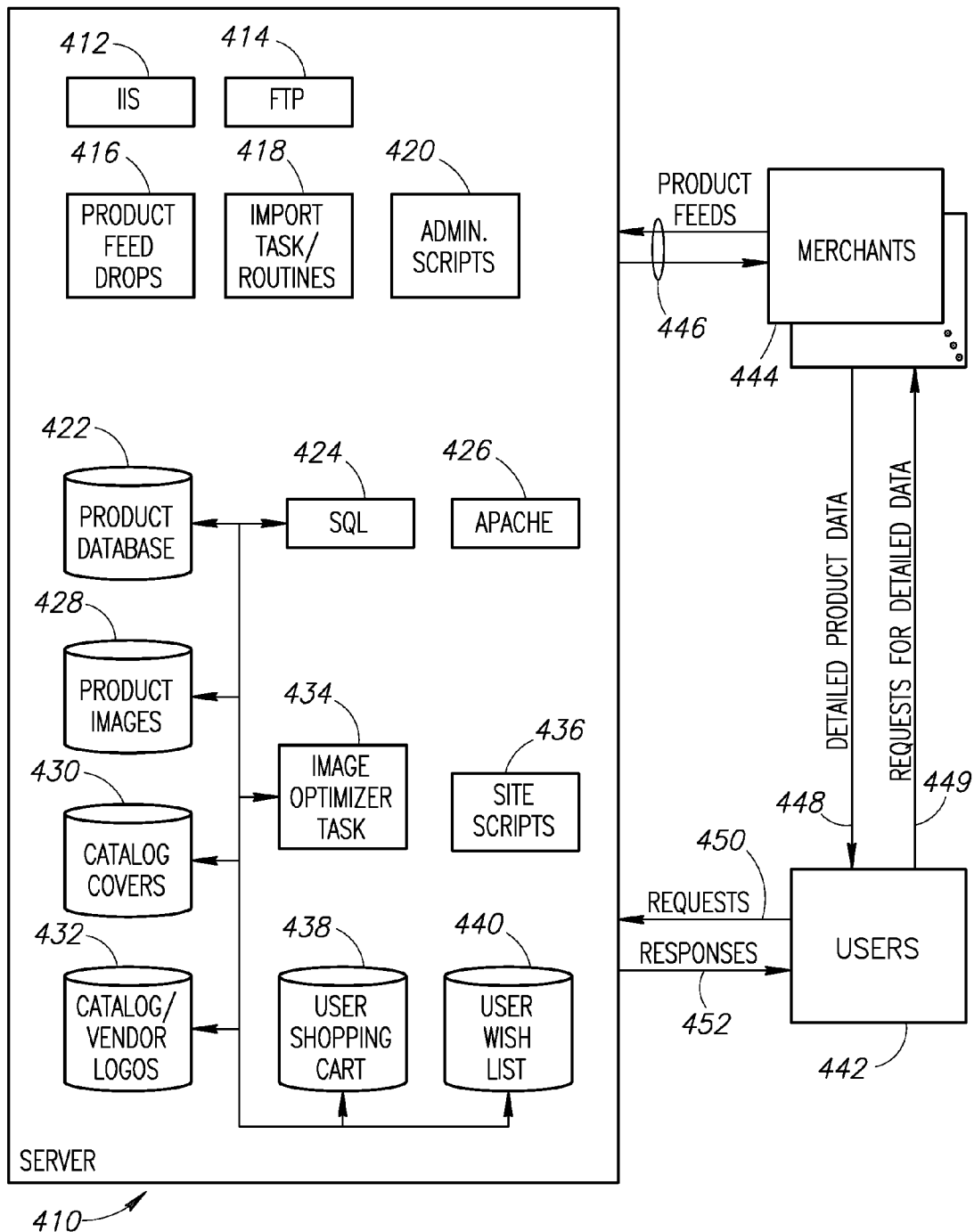
FIG. 15 is a block diagram illustrating an example of the major tasks making up the server portion of the electronic catalog system.

A block diagram illustrating an example of the major tasks making up the server portion of the electronic catalog system is shown in FIG. 15. The server, generally referenced 410, may be implemented using any suitable computing device. In operation, it runs various tasks, subsystems and databases, including but not limited to, IIS 412, FTP 414, SQL 424, product feed drops 416 from merchants 444, import routines 418, administrative scripts 420, product databases for different merchants, etc. The server also comprises a product data 422, one or more product item databases associated with each merchant, including a product images database 428, catalog cover database 430, catalog/merchant logos database 432, user shopping cart 438, user wish list 440, SQL, image optimizer task 434, site scripts 436, Apache server 426, etc.

The server is operative to receive product feeds 446 from multiple merchants 444. The product feed related processing performed by the server is described in more detail infra. Users forward requests for data 450 to the server which, in response, returns responses 452 to the users. In one embodiment, users may request additional product information wherein requests for detailed product data are made directly to the merchant site 449 and responses 448 returned to the user. In one embodiment, users are taken directly to a detailed product page on the merchant's website. In another embodiment, the data is retrieved from the merchant site and displayed via a modal window in the electronic catalog system.

In an example embodiment, the server is implemented using an operating system platform such as Windows, Linux, Sun OS, etc. and uses IIS as the FTP server to collect the product feeds from the merchants. Alternatively, Apache or any FTP server software may be used. Note that the product feeds can also be delivered offline, in an email or uploaded through an administration tool. The import routines can be implemented in PHP, but could be implemented in any language capable of opening and parsing a text, XML or XLS file. The cron jobs comprise Windows scheduled tasks, but could be implemented using the cron on a Linux machine or launched manually.

To serve catalog pages to users, a second server may be used (not shown) or the same server that is used to receive and process product feeds is used to also serve catalog pages. In one embodiment, the server has a Linux OS and uses Apache or IIS or any other web server software to serve the system. The system can be written in PHP, but could be implemented in ASP.NET, Python, Ruby on Rails, etc.), HTML5 and JavaScript. The jQuery framework is used to provide a portion of the GUI (i.e. fades, slides, content replacement). Catalog animation can be driven by a series of JavaScript functions that use a series of timed delays to simulate the page turn, simultaneously fetching future content via AJAX calls to the remote server. The image processing and optimization scripts are written in PHP, but could be implemented in ASP.NET or any language capable of advanced image manipulation.

User App/Browser Catalog Emulation

Figure 16:
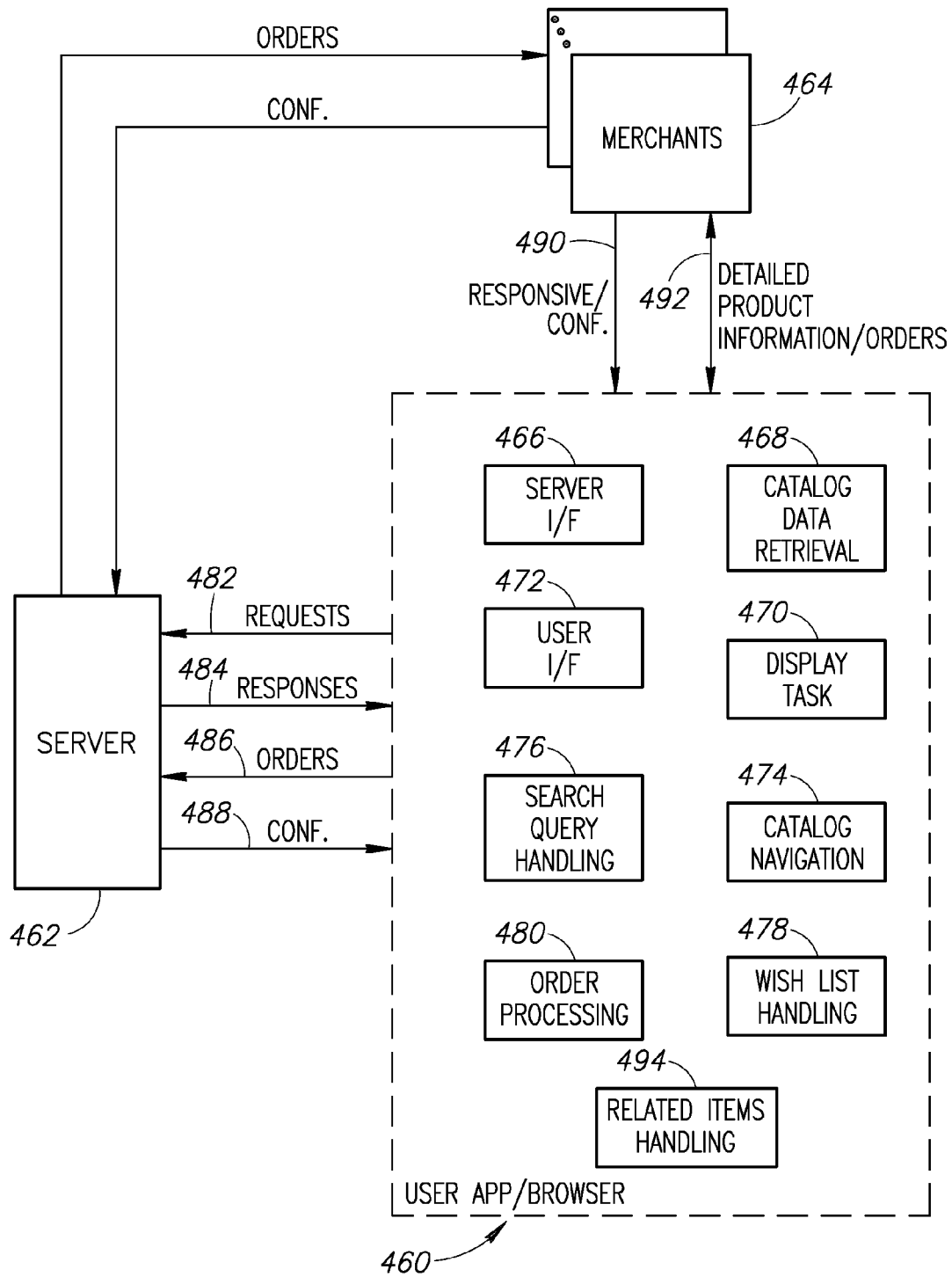
FIG. 16 is a block diagram illustrating an example of the major tasks making up the user app/browser portion of the electronic catalog system.

A block diagram illustrating an example of the major tasks making up the user app/browser portion of the electronic catalog system is shown in FIG. 16. The user app, generally referenced 16, comprises several processing blocks that together make up the functionality of the catalog emulation app. Note that users may interface with the electronic catalog system either through a dedicated software application running on a computing device or via a standard web browser, both of which are connected to the Internet.

The user app/browser communicates with the server 462 and merchant sites 464 over a wide area network such as the Internet. Requests 482 for product information and related catalog data are generated by the user and sent to the server. The server generates and sends responses 484 back to the user app/browser. In addition, in one embodiment, orders 486 and conformations 486 are handled through the server. In an alternative embodiment, orders/detailed product information requests 492 and confirmations/responses 490 are processed by the merchants directly.

The task blocks running on the app include, but are not limited to, a server interface 466, user interface 472, catalog data retrieval 468, display task 470, catalog navigation 474, search query handling 476, order processing 480, related items handling 494 and wish list handling 478.

Product Feed Processing

Figure 17:
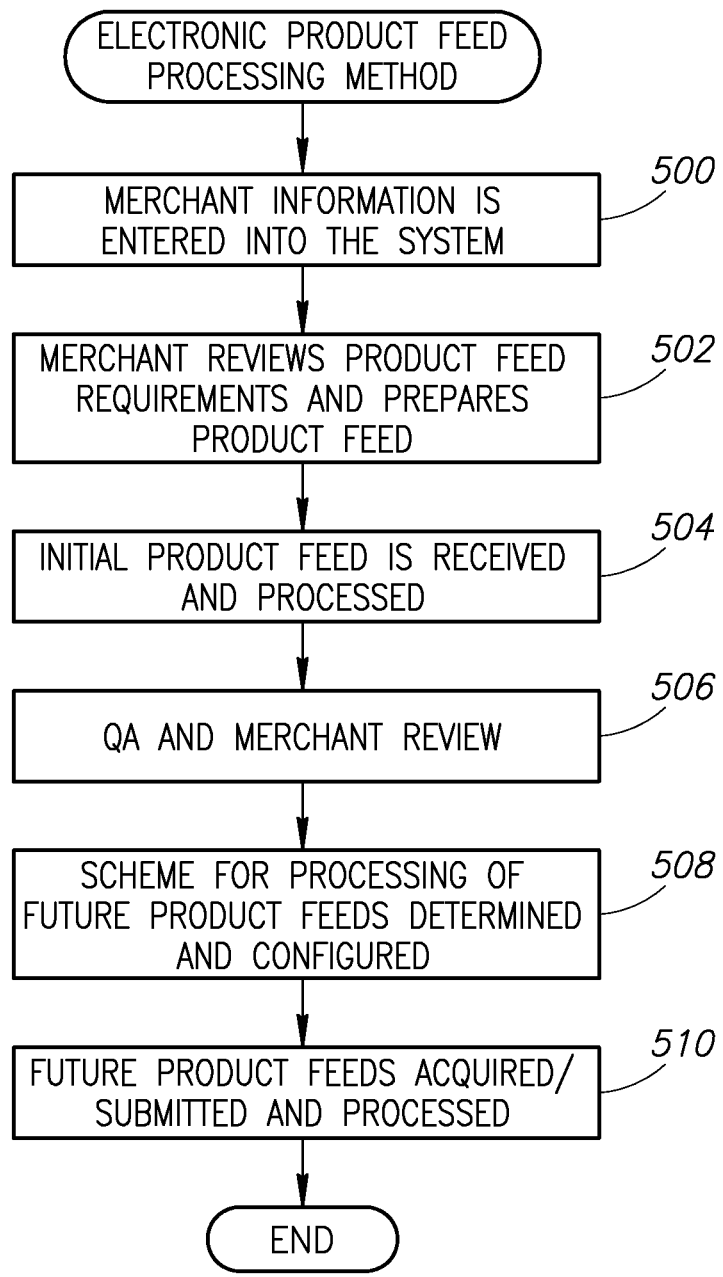
FIG. 17 is a flow diagram illustrating an overview of the electronic product feed processing method.

The product feed processing scheme will now be described in more detail. A flow diagram illustrating an overview of the electronic product feed processing method is shown in FIG. 17. As described supra, merchants provide a product feed that contains all the required product related data to generate the electronic catalogs. The term product feed refers to any suitable media and form that the data transfer may take such as via HTTP file, FTP file, live data stream, a file that is retrieved ('pulled') from the merchant rather than 'pushed' from the merchant to the server, tape, portable hard drive, CDROM, DVD, etc.

Initially, merchant related data is entered into the system (step 500). During this step, various options as to the nature of the product feed transfer to occur between the particular merchant and the server is defined and configured. For example, how the physical data is to be transferred, setting up the merchant's credentials in the system, e.g., tokens, passwords, encryption keys, etc.

The merchant then reviews the product feed requirements and prepares the product feed (step 502). The product feed requirements include the various formatting rules that the product data is to take. In one embodiment, the merchant is provided a format checking tool that they can use to determine before sending the feed whether the feed meets the required format.

After the merchant prepares and formats a product feed with their catalog items, the initial product feed is received by the server and processed (step 504). A more detailed description of the processing of the product feed is provided infra. Once the product feed is processed, it can be viewed as an electronic catalog and quality assurance is performed along with review by the merchant (step 506). In this step, a link (URL) can be sent to the merchant to view the online electronic catalog.

The manner in which the merchant desires to send future product feed updates is then determined and configured (step 508). For example, a merchant may desire to provide a URL and have the server periodically check for an update, or have a product feed update available via FTP or via the Merchant Services Portal where the merchant uploads the updated product feed. After the initial product feed is processed, future feeds are acquired (or submitted) and processed in the same manner the initial product feed was (step 510).

Figure 18A:
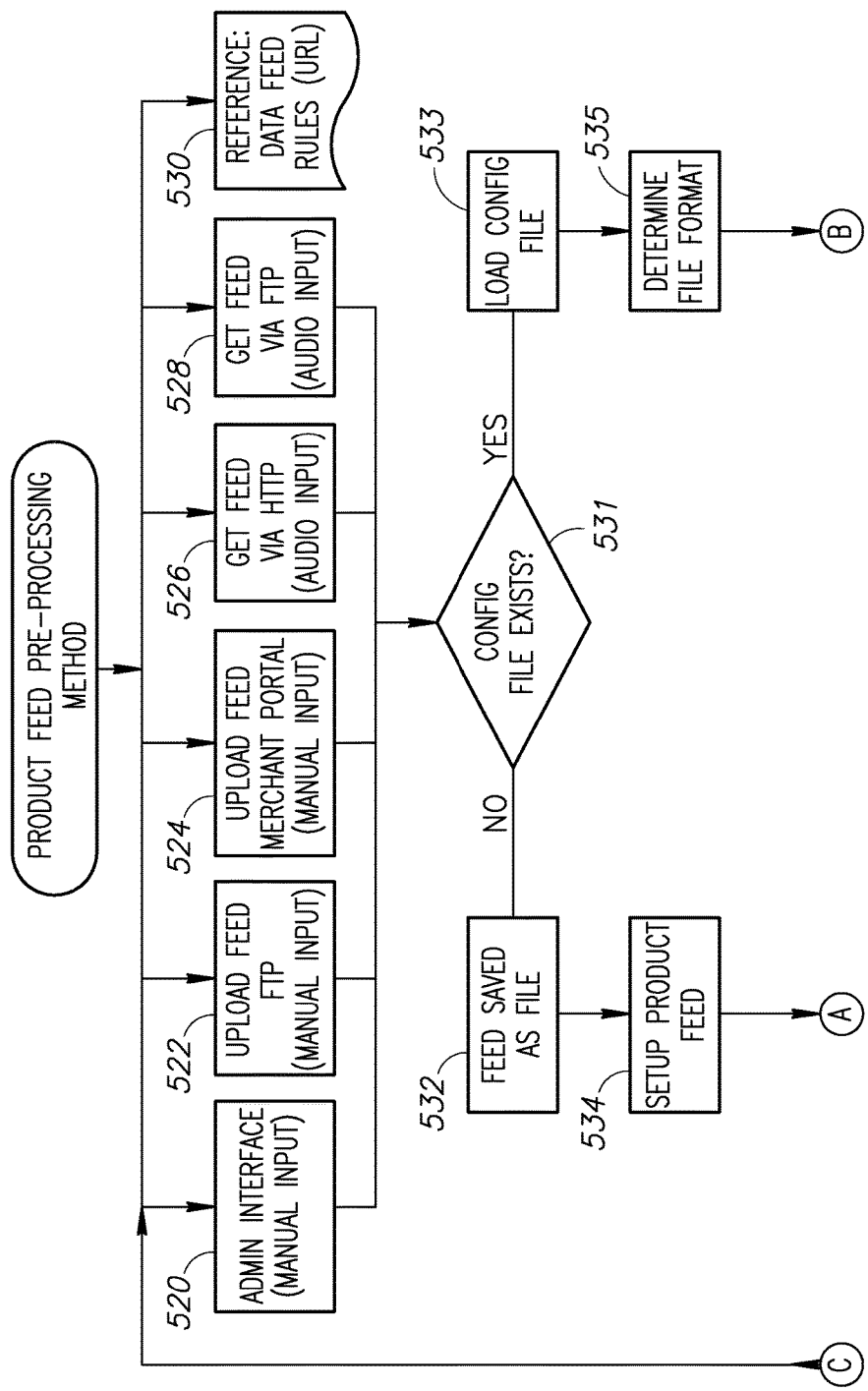
FIGS. 18A and 18B are a flow diagram illustrating an example electronic product feed pre-processing method.
Figure 18B:
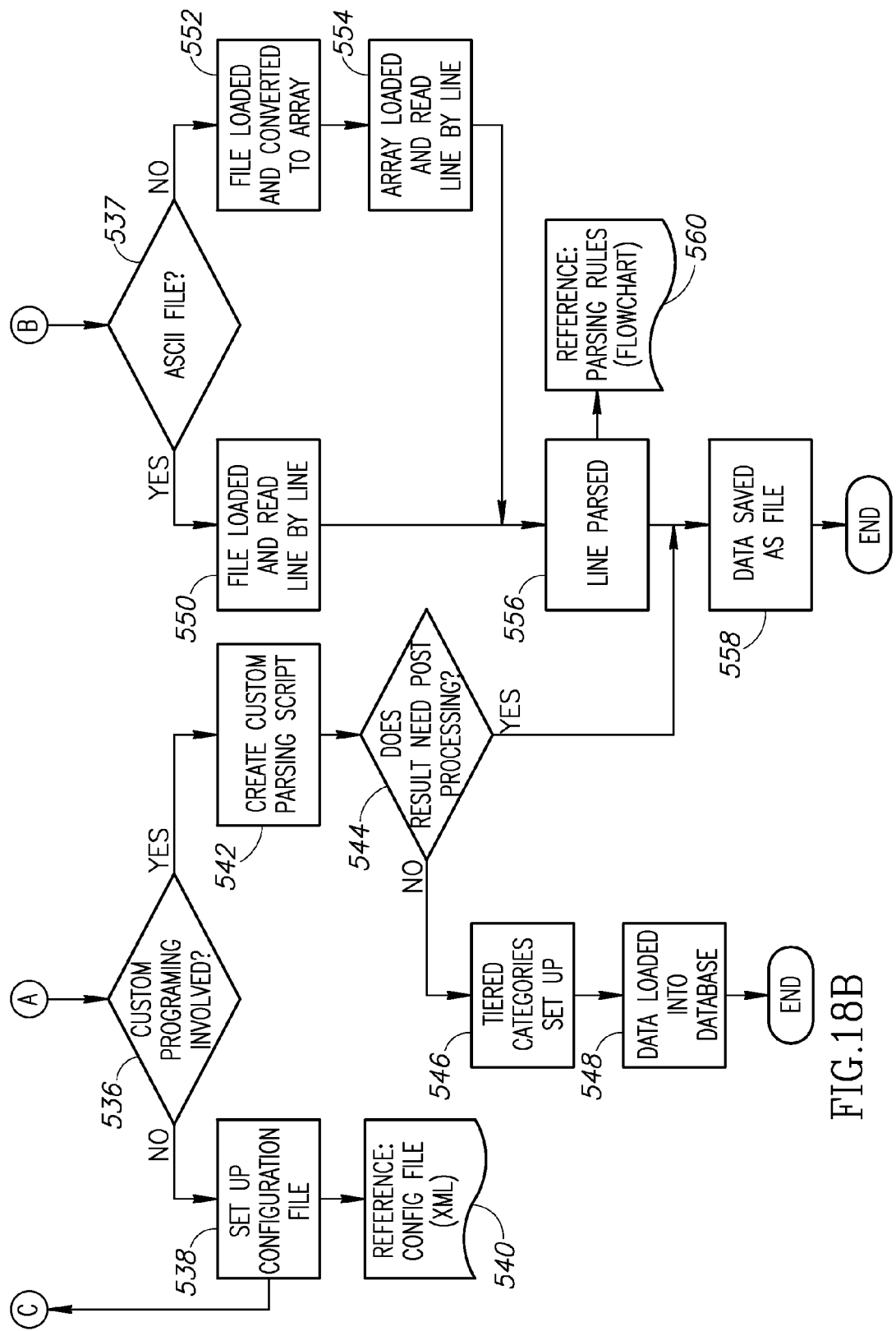

A flow diagram illustrating an example electronic product feed pre-processing method is shown in FIGS. 18A and 18B. As described supra, there are multiple ways for merchants to submit product feeds, such as via FTP, as a Cron Job which retrieves the feed from the participating merchant's website via an administrators interface (manual input) (step 520), uploading the feed via FTP (manual input) (step 522), uploading the feed via the web-based Merchant Service Portal (manual input) (step 524), obtaining the feed via HTTP (automatic input) (step 526) and obtaining the feed via FTP (automatic input) (step 528). The feed is required to meet the product feed rules URL 530.

Once the product feed is obtained, it is checked whether a configuration file exists associated with the merchant (step 531). If it does exist, it is then loaded (step 533) and the file format of the product feed is determined, such as by examining the file extension (step 535). If the file (i.e. product feed) is an ASCII file (step 537), the file is loaded and read line by line (step 550). Each line is parsed using the parsing rules 560 as reference according to the rules in the configuration file (step 556). If the product parses successfully, the product data is saved in a file having a standardized format (step 558).

If the file is not an ASCII file (step 537), the file is loaded and converted to an array (step 552) and the array is loaded and read line by line (step 554). The method continues with step 556 as described supra.

If the configuration file does not exist (step 531), the product feed is saved as a file in the same file format as the original input (step 532). The product feed is then setup (manually or automatically via a software 'wizard') and the structure of the feed is examined (step 534). If custom programming is required (step 536), a custom parsing script is generated (step 542). For example, the mapping of field names may be required, product IDs may be mapped to SKUs, etc. If the result needs post processing (e.g., categorizing, entering data in the initial database, etc.) (step 544), the method continues with step 558 and the data is saved as a file having a standardized format. If the result does not need post-processing, tiered categories are set up (step 546) and the data is loaded into the product database (step 548). If custom programming is not required (step 536), then the configuration file is set up (step 538) and the system is ready for future product feed updates.

Figure 19A:
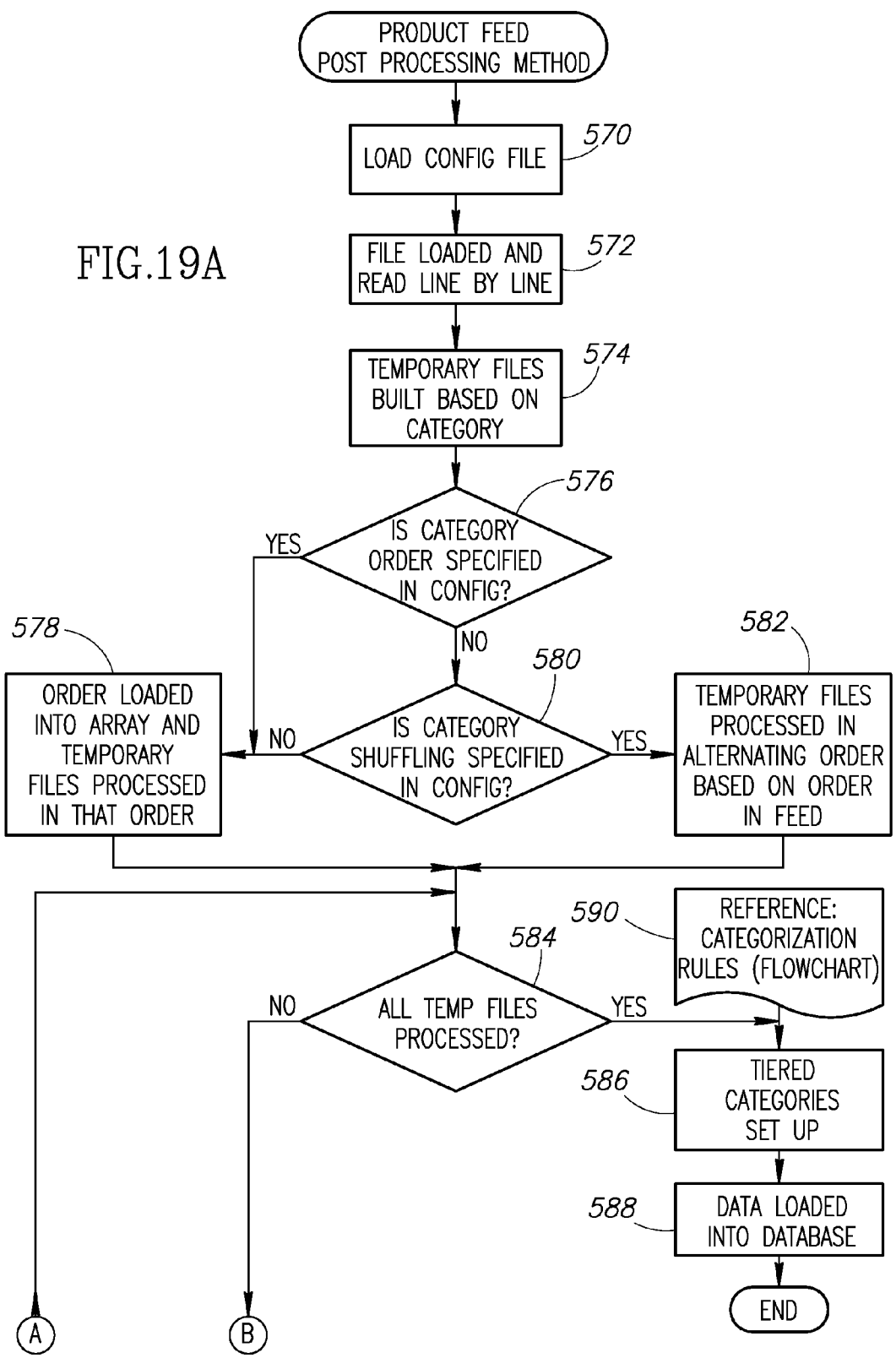
FIGS. 19A and 19B are a flow diagram illustrating an example electronic product feed post-processing method.
Figure 19B:
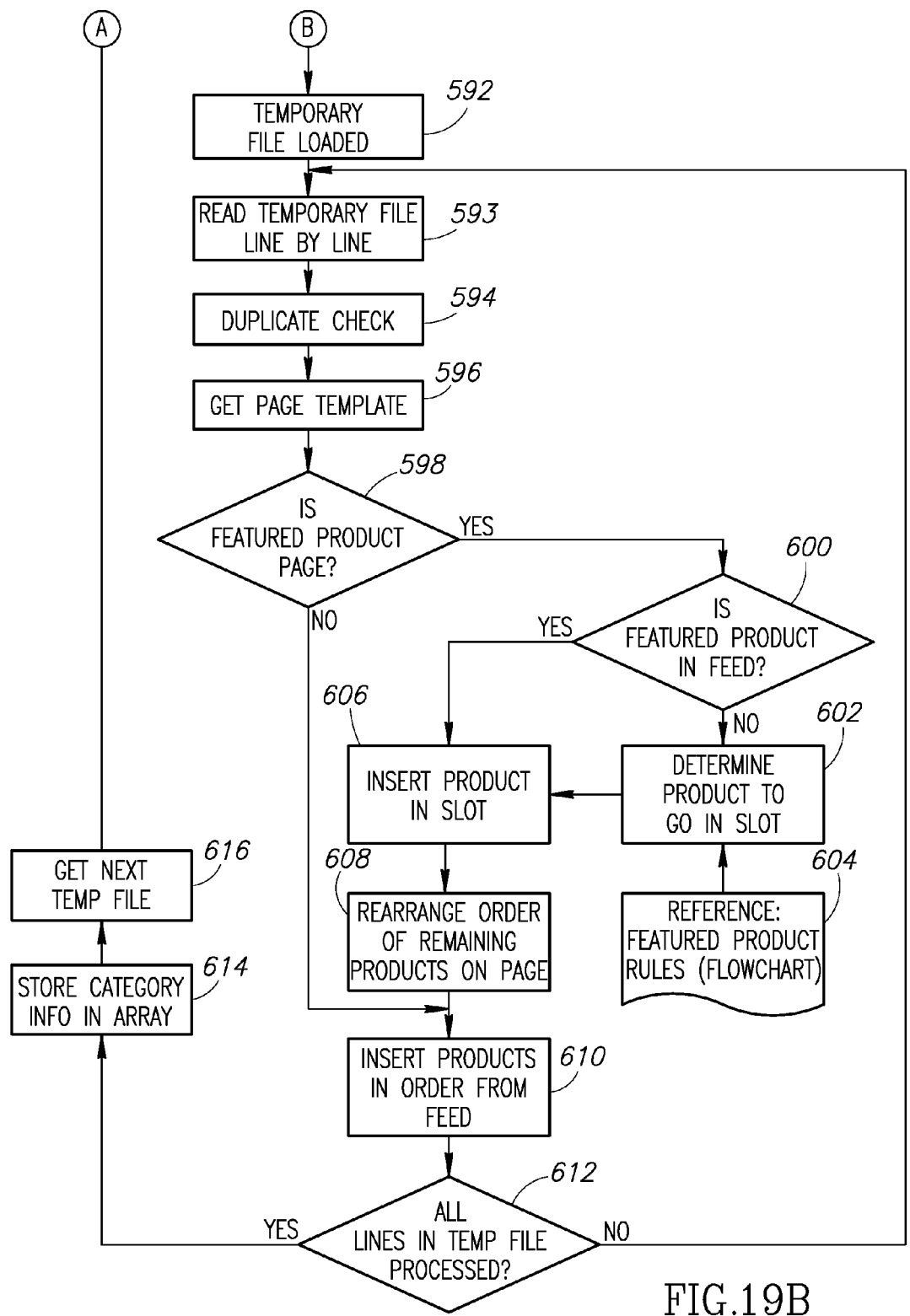

A flow diagram illustrating an example electronic product feed post-processing method is shown in FIGS. 19A and 19B. After pre-processing is complete, the product feed has been converted into a standardized file format. First, the configuration file is loaded (step 570) and the product data file is loaded and read line by line until the end of the file is reached (step 572). Temporary files are then built based on category (step 574), where one temporary file per category is built. If the category order is specified in the configuration file (step 576), then the category order is loaded into an array and the temporary files are processed in that order (step 578) and the method continues with step 584.

If the category order is not specified in the configuration file (step 576), then if category shuffling is specified in the configuration file (step 580), the temporary files are processed in alternating order, either alternating a pair of categories at a time or all categories (step 582). Note that the products in the catalog may be shown (1) in the order of the product feed; (2) in a category order specified by the merchant; (3) in pairwise category alternating order; or (4) in full alternating category order meaning showing products through the first to last categories and then repeating the order. If category shuffling is not specified in the configuration file (step 580), then the method continues with step 578.

If all the temporary files have not been processed (step 584), the temporary file is loaded (step 592) and read line by line (step 593). A duplicate check is performed on the product (step 594) and the page template associated with the product is retrieved (step 596). If the page is a featured product page (step 598) and is a featured product in the product feed (step 600), the product is inserted into the slot on the page (step 606), the order of the remaining products on the page is re-arranged (step 608) and other products are inserted in order of the product feed (step 610).

If all lines in the temporary file have not been processed (step 612), the next line of the file is read (step 593). If they have, category information is stored in an array (step 614) and the next temporary file is loaded (step 616) and the method continued with step 584.

If the page is a featured product page (step 598), but the featured product is not in the product feed (step 600), then a product is selected to place in the featured slot on the page, with reference to featured product rules described in more detail infra (step 602).

Once all the temporary files have been processed (step 584), tiered categories are set up (step 586) and product data is loaded into the product database (step 588). Once written to the product database, the product data can be used to display the electronic catalog to a user.

Thus, once the product feed is submitted, a process routine in the server extracts the data required for the catalog, converts the feed from its original format (xls, xlsx, txt, csv, tsv, xml, etc.) to a single, standardized format and saves the processed file on the server ready to be imported via the import routine. Product feeds contain multiple items of information about each product to be included in the catalog: sku, name, description, manufacturer, price, product URL, image URL and a list of their own categories the product appears in. Optionally, additional data in the feed may be included such as, but not limited to, colors, sizes, popularity, relevance, featured video, additional options, discount offers, catalog cover images, company logos, etc.

As described supra, merchants can change the contents of their catalogs at will. The new/changed product feeds are detected by the server and processed. Product data in the database is updated (add/change/delete) in accordance with the new/updated product feed received from the merchant. In this manner, users viewing catalogs in the catalog emulation app, always view the latest catalog contents.

Merchants can transmit their data to the database server via File Transfer Protocol (FTP). Merchants are provided with security credentials and a location on the server where they can deposit their product data feeds. The merchant can make these transmissions occur automatically with no intervention by the merchant.

Alternatively, the server can initiate scheduled tasks to retrieve merchant product feed data. Jobs can be scheduled to check the merchant's server for new files and automatically download them to the server. Jobs can be scheduled to check the server FTP directories for new files that have been transmitted by merchants and jobs can be scheduled to check the Merchant Service Portal for new product feed files entered via that service.

The Merchant Service Portal is a web-based interface residing on the server whereby merchants can control the content and appearance of their electronic catalogs, upload their data feeds and control their catalog's appearance. A portal on the server provides a user interface for prospective merchants to sign up for the service, pay for the service via credit card and set up their custom data feeds. Merchants who are subscribed, as part of the service provided, are able to log in to the portal to change, add/delete products in their data feeds, change graphics and perform other creative tasks. Page appearance can be altered in the portal and merchants can change page backgrounds, color schemes and how many products and what sizes of images appear on their electronic catalog pages. All of the merchant's interaction with the service can be done without any intervention from the subscription service itself. Merchants have total control of the content of the product feed and frequency of updates of their product information. Features of the Merchant Service Portal include: (1) providing a method for merchants to set up their initial feed via a step-by-step wizard; (2) submitting future feeds; (3) manipulating the order of the products in their feed; (4) enabling or disabling advanced catalog options; (5) uploading new catalog covers; (6) changing page backgrounds; (7) modifying discounts or special offers; (8) configuring mini-catalogs; and (9) performing various other catalog modifications.

Cron jobs on the server periodically scan the upload directories for new files. When a new file or changes are found, an import routine is launched that formats and normalizes the data (e.g., scrubs symbols and commas from numeric values and characters outside the HTML spectrum from text). The import routine also (1) rearranges the catalog order based on different items of information (e.g., category, featured); (2) manipulates the category names and category breakdown; (3) eliminates or manipulates individual products based on different items of information (e.g., inventory, category, name, description, etc.); (4) processes specials, discounts or featured items; (5) manipulates the image URL (if necessary); and (6) appends or modifies product URL tracking information.

In one embodiment, a bad link sniffer robot automatically finds all product links that lead to dead or missing pages and removes that product entry from the electronic catalog. The massaged formatted product data is stored in the product database. Images may or may not be stored in the database. For example, only URL information is provided from the merchant, which may or may not be stored in the database and used to retrieve images via a link to their locations on the merchant's servers rather that have the actual images sent in the product data feeds. This minimizes processing time and data storage.

Cron jobs on the server then cycle through new products and, based on the stored URLs, download remote images from the merchant specified URLs. The images are optimized for viewing on the system and then stored in several specially sized versions locally. This eliminates the dependence on the merchant sites when serving customers. Products with faulty images, duplicate products and products missing primary information are deleted from the product database. If a catalog is new, all SKU's are entered into the database. If a catalog is an existing catalog, any URLs missing in the feed are removed and any new ones are added.

The server then serves the electronic catalog of products to users via a series of medium including desktops, laptops, tablets (e.g., iPad), mobile devices, smartphones, etc. using browsers via HTTP. Browsers include but are not limited to Safari, Internet Explorer, Firefox, Chrome, Android and others.

Figure 20A:
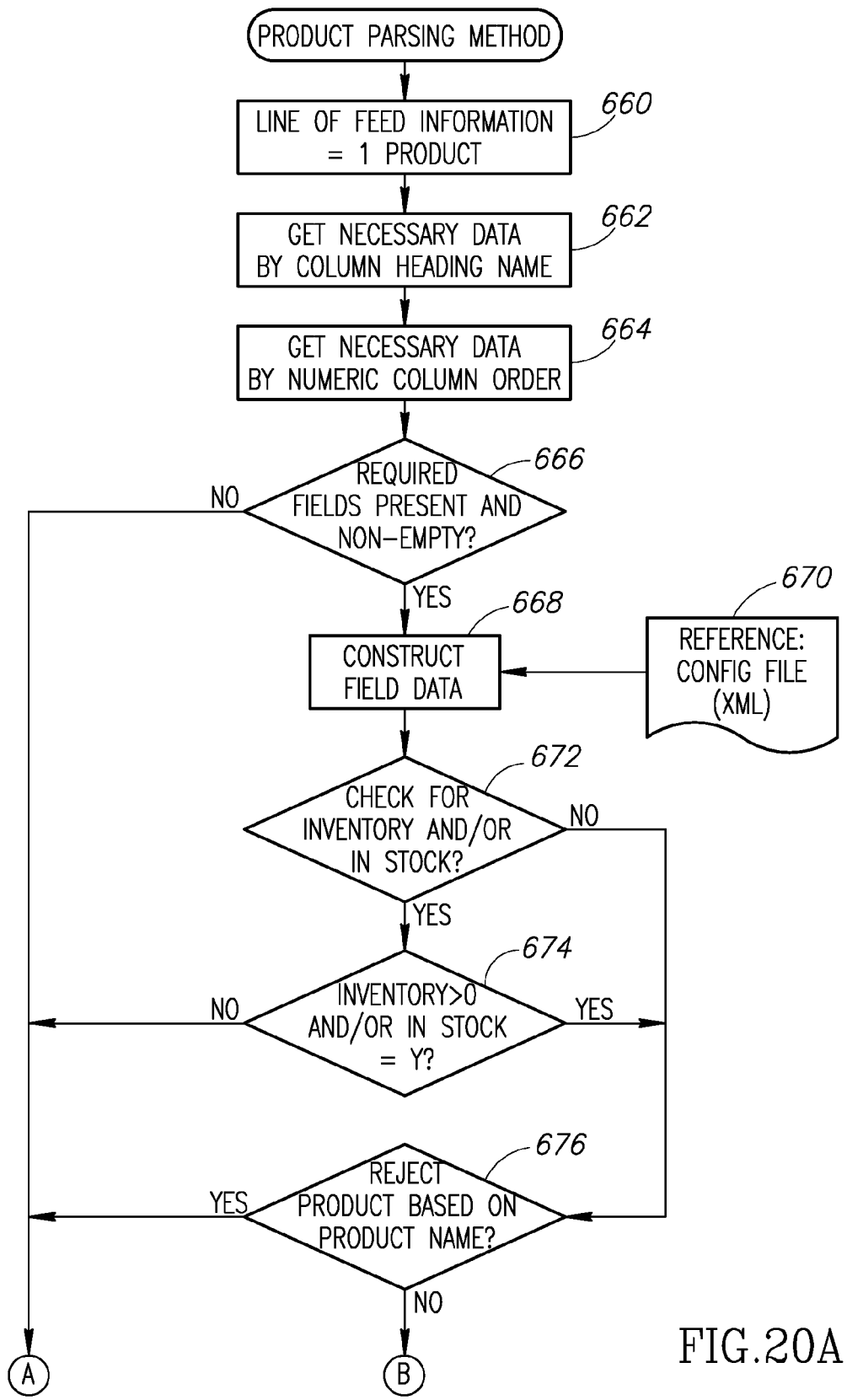
FIGS. 20A and 20B are a flow diagram illustrating an example product parsing method.
Figure 20B:
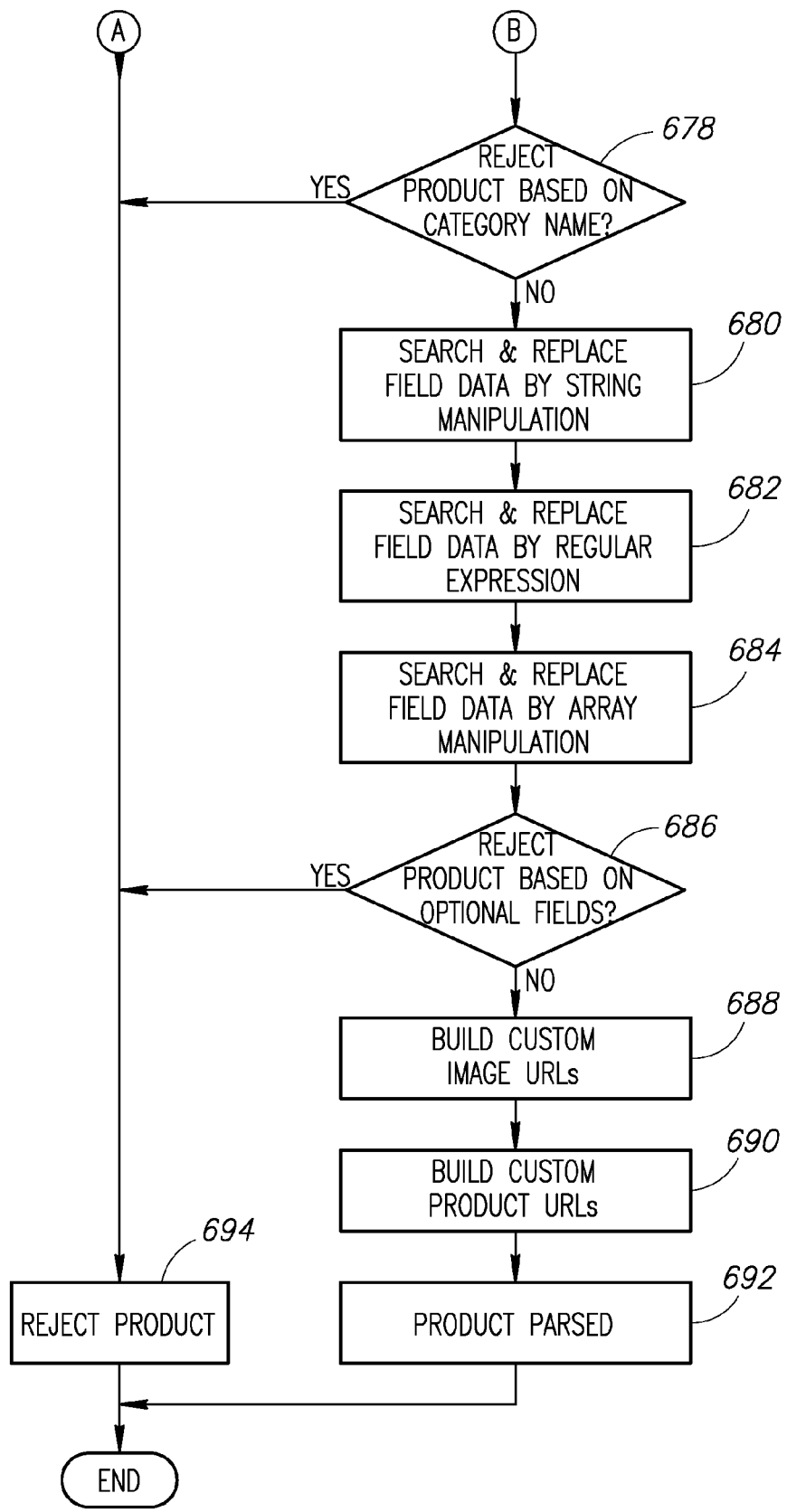

A flow diagram illustrating an example category parsing method is shown in FIGS. 20A and 20B. The product parsing method is performed for each item read from the product feed. The line of feed information is set to one product, meaning one product per line or row of the feed (step 660). In accordance with the configuration file, the required data is read either by column heading name (step 662), and/or by numeric column order (step 664). If the required fields are not present and/or empty (step 666), the product item is rejected (step 694).

If the required fields are present and non-empty, field data is then constructed using the configuration as a reference (step 668). If an inventory check is to be performed (step 672), and the product has no inventory and/or is not in stock (step 674), then the product is rejected (step 694). If no check is required (step 672), or inventory >0 and/or stock=YES (step 674), then the product is checked whether the product is to be rejected based on its name (step 676). The purpose of this check is to weed out products whose name does not make sense given other information gleaned from the product information available. A similar check is performed on the product category (step 678).

If the product passes both checks, the product information fields are massaged and put into a standardized format via a search and replace operation, using either string manipulation (step 680), regular expressions (step 682) or array manipulation (step 684). The product may then still be rejected based on optional fields (step 686).

Custom image URLs are then built for purposes or retrieving the image from merchant websites (step 688). Custom product URLs are also built (step 690) which are used when users click on the "Buy/More Info" button on a product in a catalog. At this point, the product is deemed parsed (step 692).

Figure 21A:
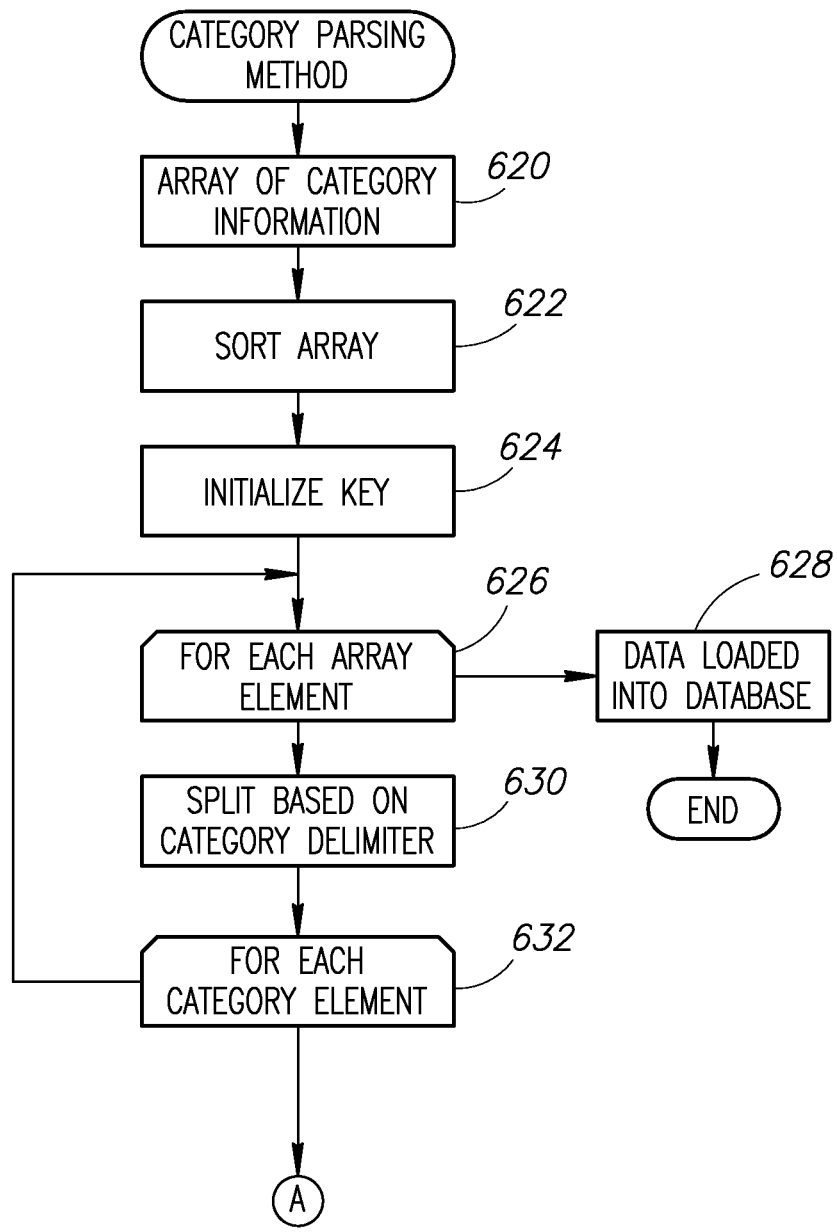
FIGS. 21A and 21B are a flow diagram illustrating an example category parsing method.
Figure 21B:
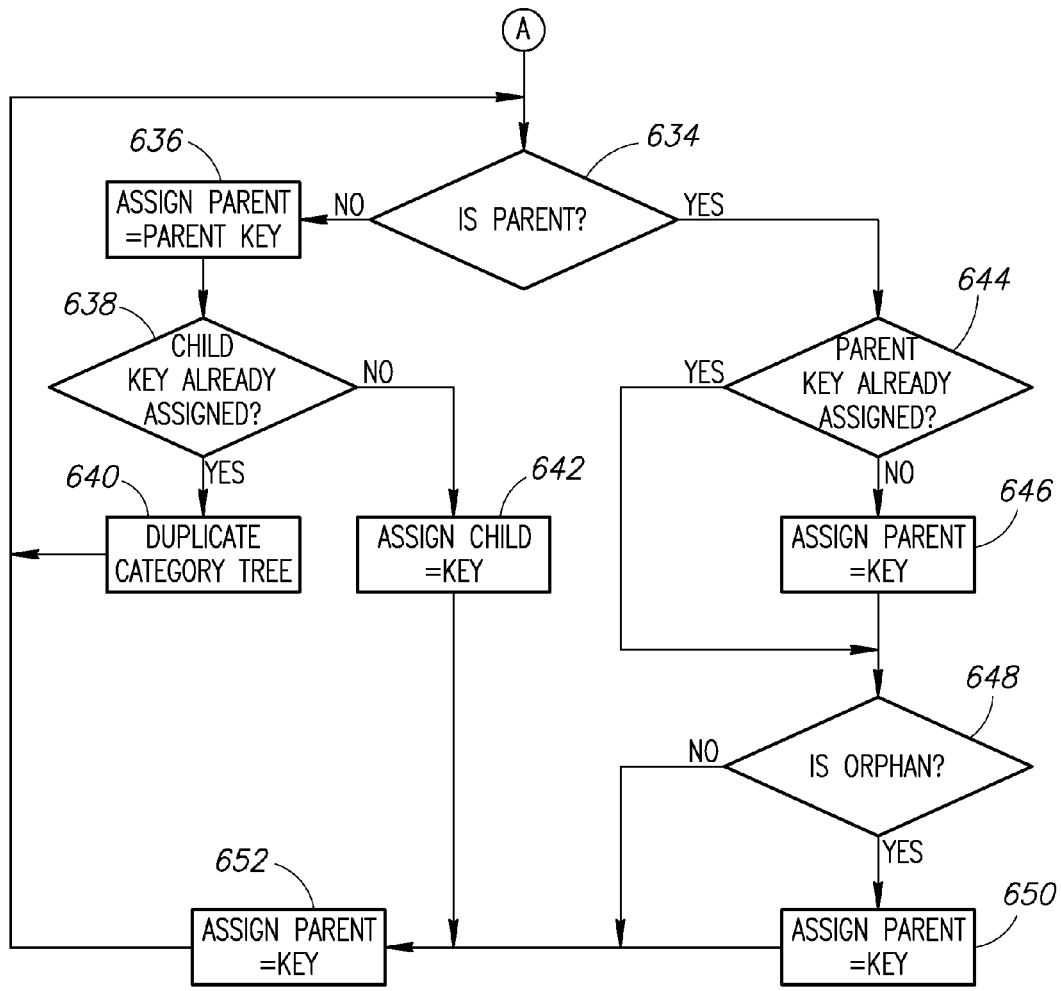

A flow diagram illustrating an example product parsing method is shown in FIGS. 21A and 21B. The category parsing processes the category read from the product feed and generates the category hierarchy for the catalog. The method begins with the array of category information (step 620). The array is sorted (step 622) and a key is initialized (step 624). A loop is set up whereby for each array element (step 626), the array entries are split based on the category delimiter found in the configuration file, e.g., colon, comma, pipe symbol, etc. (step 630). Note that parent and child categories are assigned based on the data read from the array, e.g., "jeans" is a parent category while "5-pocket jeans", "children's jeans", etc. are child categories. A second loop is formed for each category element (step 632).

If the category is a parent category (step 634), the parent key was not yet assigned (step 644), and it is not an orphan (step 648), then a child key is assigned (step 650). The two loops then iterate (step 652) and the method continues with step 634. If the parent key has not been assigned (step 644), then a parent key is assigned (step 646).

If the category is not a parent (step 634), a parent key is assigned (step 636). If a child key has not been assigned (step 638), a child key is assigned (step 642), the loops iterate and the method continues with step 634. If a child key was already assigned (step 638), the category tree is duplicated (step 640) and the method continues with step 634. When all array elements have been processed (i.e. both loops finish) (step 626), the data is loaded into the product database (step 628).

Figure 22A:
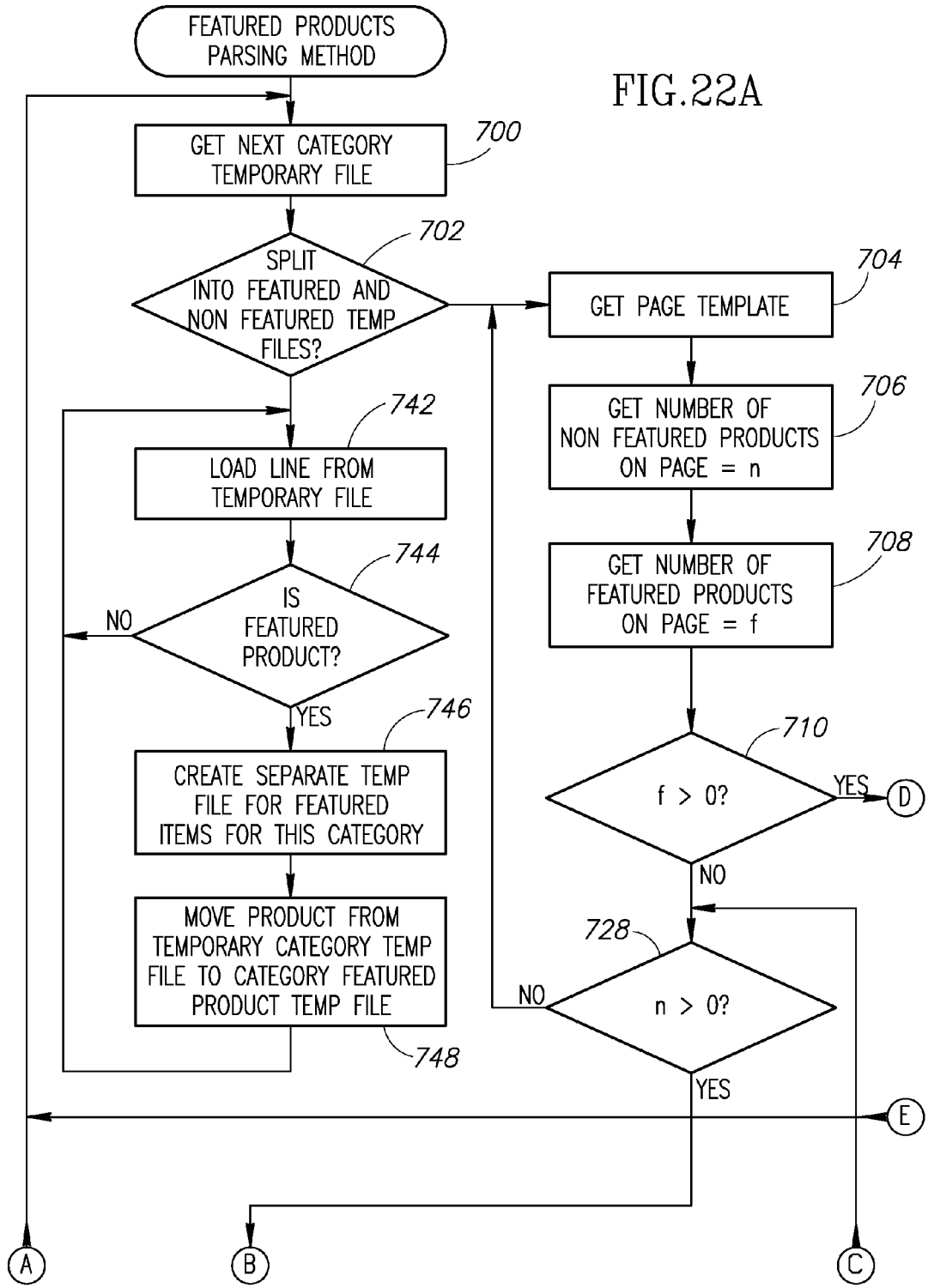
FIGS. 22A, 22B and 22C are a flow diagram illustrating an example featured product parsing method.
Figure 22B:
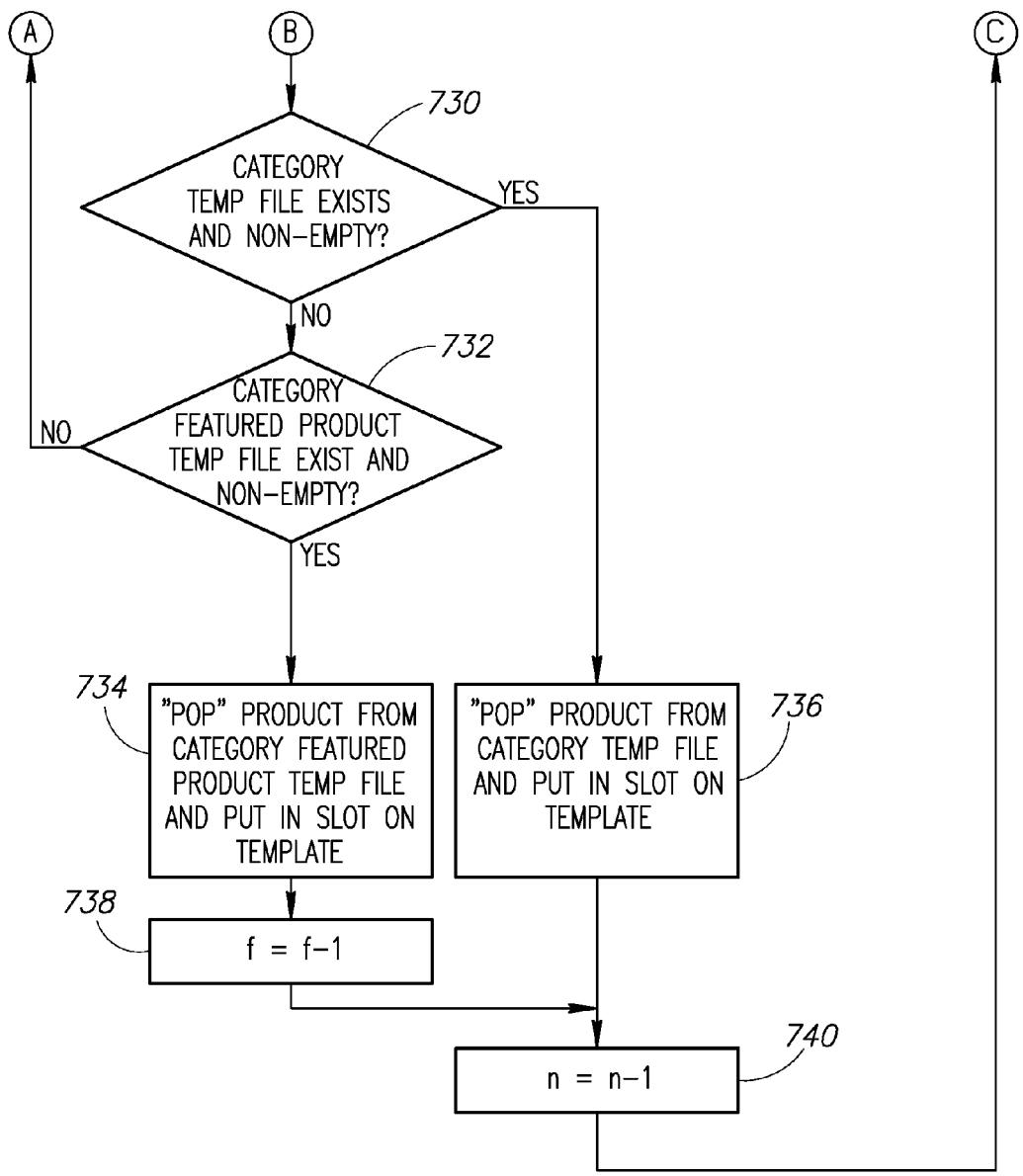
Figure 22C:
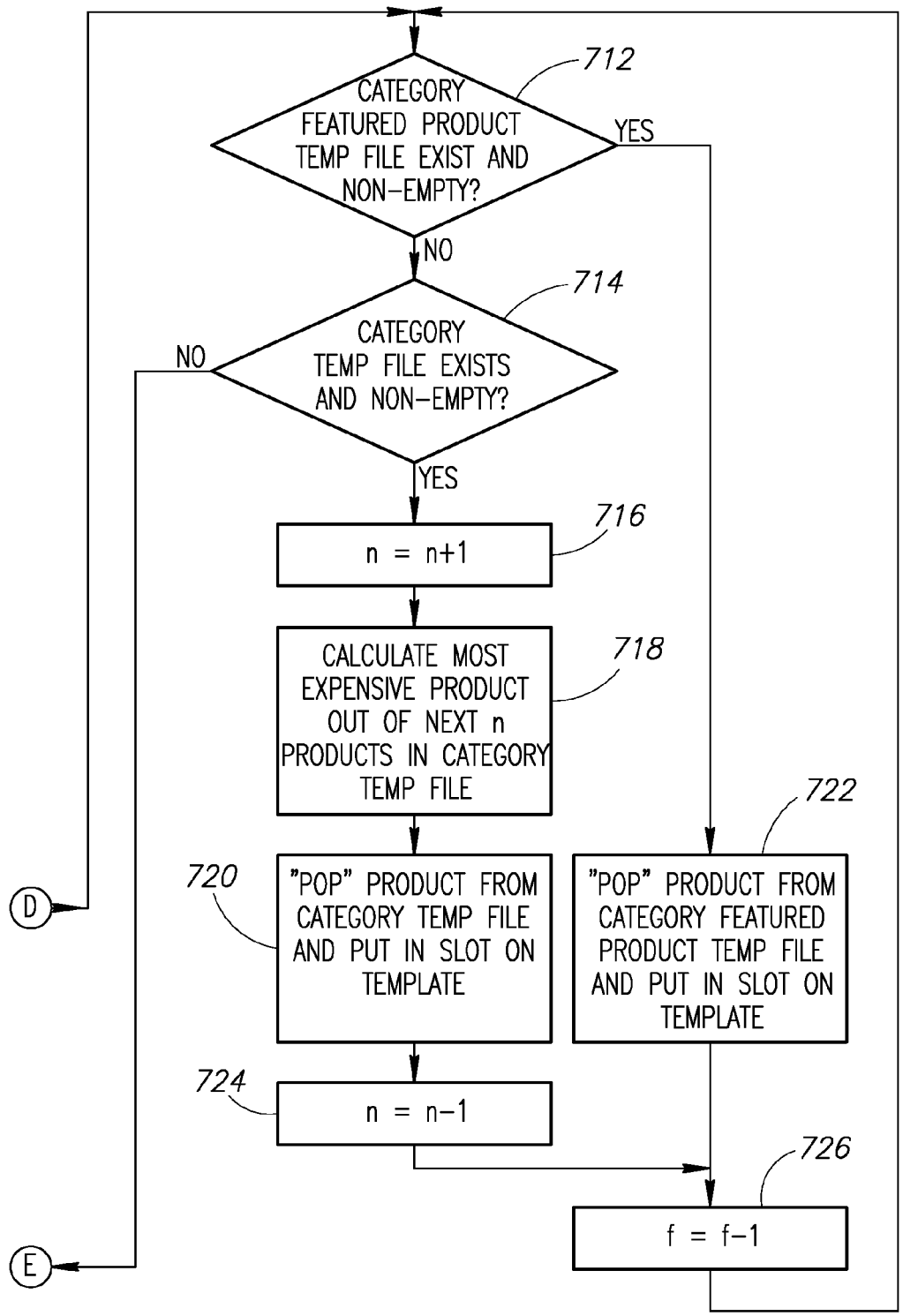

A flow diagram illustrating an example featured product parsing method is shown in FIGS. 22A, 22B and 22C. This method functions to handle the parsing and placing of featured products in particular slots designated for that purpose on product pages. The process is driven by category and operates on the category temporary files generated previously. The next category temporary file is fetched (step 700) and it is then checked whether the file is to be split into featured and non-featured temporary files (step 702). If not, a product line is loaded from the temporary file (step 742). If it is not a featured product (step 744), the loop iterates and the next product line is fetched. If it is a featured product, a separate temporary file is created for featured items for this category (step 746). The product is moved from the temporary category temporary file to the category featured product temporary file (step 748). The loop then iterates.

If the category temporary file is not to be split (step 702), the page template is retrieved (step 704), the number 'n' of non-featured products on the page is determined (step 706) and the number 'f' of featured products on the page is determined (step 708). If f>0 (step 710) and the category featured product temporary file exists and is non-empty (step 712) then the product is 'popped' (i.e. moved) from the category featured product temporary file and placed in a slot on the product page (step 722). The loop variable f is decremented (step 726) and the method returns to step 710. If the category featured product temporary file does not exist or is empty (step 712) then if the category temporary file does not exist and is empty (step 714), then the next category temporary file is retrieved (step 700).

If the category temporary file does exist and is non-empty (step 714), then n is incremented (step 716) and the most expensive product out of the next n products in the category temporary file is determined (step 718). This product is then popped from the category temporary file and put in the appropriate slot on the page template (step 720), The loop counters n and f are decremented (steps 724, 726, respectively) and the method returns to step 710.

If f is not greater than zero (step 710), and n is not greater than zero (step 728), then the next page template is retrieved and the method returns to step 704. If n>0 (step 728) and the category temporary file exists and is non-empty (step 730), the product is popped from the category temporary file and placed in the slot on the page template (step 736). The loop variable n is decremented (step 740) and the method returns to step 728.

If the category temporary file does not exist or is empty (step 730), and if the category featured product temporary file does not exist or is empty (step 732), the method returns to step 700. Otherwise, the product is popped from the category featured product temporary file and placed in the slot on the page template (step 734). The loop counters f and n are decremented (steps 738, 740, respectively) and the method returns to step 728.

Figure 23A:
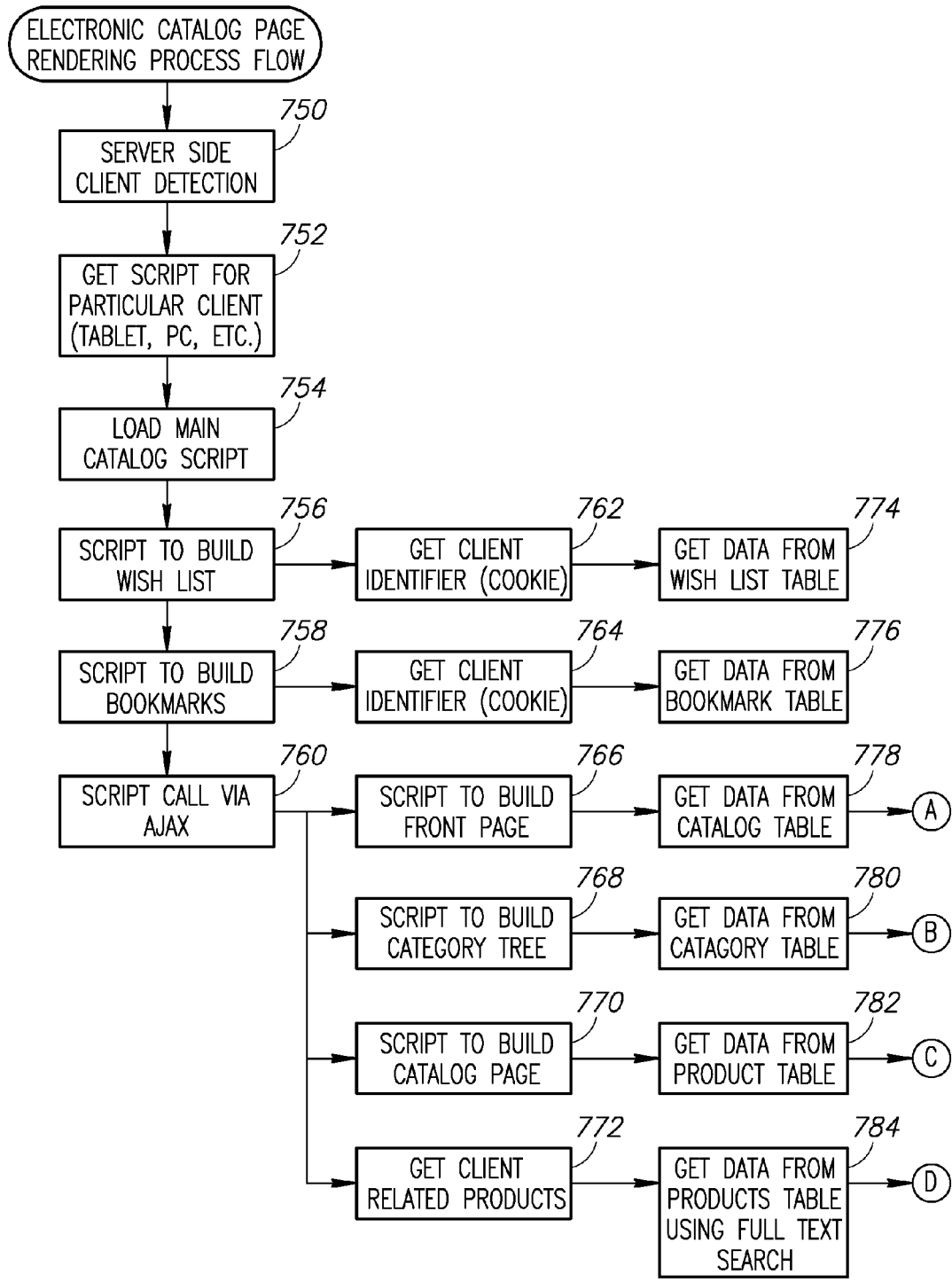
FIGS. 23A and 23B are a flow diagram illustrating an example electronic catalog page rendering process flow.
Figure 23B:
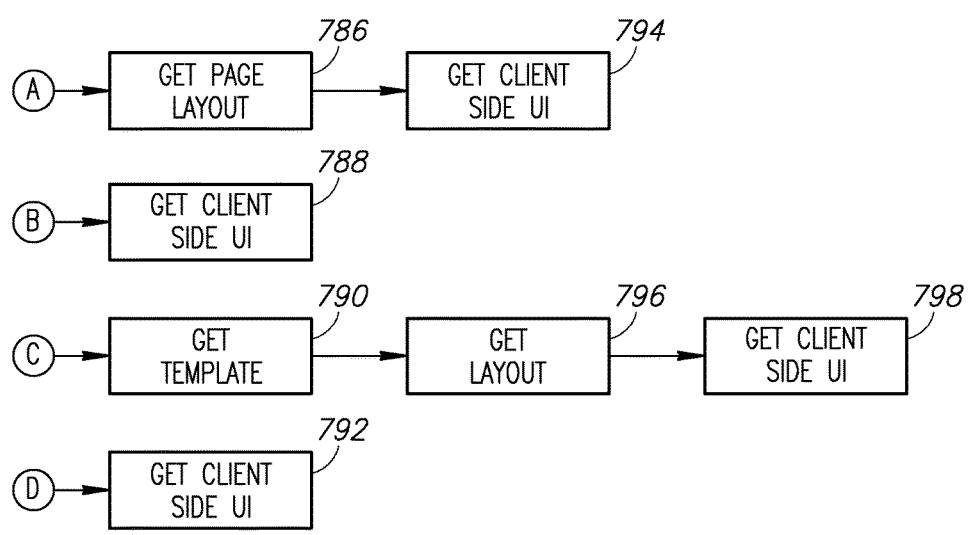

A flow diagram illustrating an example electronic catalog page rendering process flow is shown in FIGS. 23A and 23B. The rendering process flow describes how catalog pages are generated for display to the user. Note that although the process is presented in a linear manner, during the rendering process, several scripts can run in parallel. First, the server detects the client connection (step 750). The server obtains information regarding the client, such as the client's browser (IE, Safari, Firefox, etc.), type of computer (PC, MAC, tablet, phone, etc.), etc.

Based on the client information obtained, the scripts for that particular client type are retrieved (step 752). In one embodiment, a single main catalog script is loaded that calls all the other required scripts (step 754). This main script includes, for example, a script to build a wish list (step 756) whereby the client identifier (i.e. a cookie) is obtained (step 762) and data is read from the wish list table (step 774). A script to build bookmarks (placeholders in a catalog set by users) (step 758) includes getting the client identifier (i.e. a cookie) (step 764) and reading data from the bookmark table (step 776).

Pages are built using a script call via AJAX (step 760) and includes a script to build the cover page (step 766) whereby data is read from the catalog table (step 778), the page layout is retrieved (step 786) and the client side user interface is run (step 794). The script to build a category tree (step 768) retrieves data from the category table (step 780) and runs the client side user interface (step 788).

The script to build catalog pages (step 770) retrieves data from the products table in the products database (step 782), retrieves the appropriate page template (step 790) and layout (step 796) and runs the client side user interface (step 788). The script to build related products listings (step 772) retrieves data from the products table using full text search (step 784) and runs the client side user interface (step 788).

In an example embodiment, each catalog and mini-catalog is couched in single page constructed dynamically from a PHP script. The catalog page data is retrieved via an AJAX call to separate PHP scripts. Java Script is used to create the sliding motion, perform the AJAX calls, place the returned content and affect other user interface changes on the page. Thus, the user never leaves the original page but fresh content is delivered in manageable chunks, providing a smooth flow of information and a pleasant browsing experience.

The page content itself is constructed via a series of PHP scripts, each adapted to provide a specific layout. The parent script fetches the product data from an MS-SQL database and feeds it to the appropriate layout script. An additional script provides the framework for the "More Information" box. Both of these provide the HTML that is returned and displayed to the user.

Regarding related products, in an example embodiment, they are determined using the full-text search capabilities of MS-SQL's. The results are ranked and the qualifying products provided to the user "best first". The data is retrieved on demand as a light box opens using Java Script to make an AJAX call to a PHP script. Subsequently, when a related product is touched/clicked, the data needed to populate the content area of the light box is then retrieved in the same fashion.

Note that the advantage of breaking the product data into multiple tiers helps to accomplish the greater goal of a smoother user experience, where data is retrieved on demand in small, quickly answered requests, taking advantage of the natural reading patterns of a typical user.

In all cases, the landing page presents the user with a selection of departments which link to department pages featuring relevant catalog covers dynamically generated from the catalog data in the remote database. Each cover image then links to the corresponding catalog.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An apparatus for automatically distributing and updating electronic content from remote computers to a server computer over a communications network, comprising:
   a server computer, the server computer including:
      a processor;
      memory coupled to the processor operative to store application program code and data;
      a first database stored in the memory and operative to separately store received from each remote computer;
   the processor suitably programmed to provide a web-based user interface for receiving and managing electronic data feeds from a plurality of remote computers, wherein data feed includes a suitable media and form for implementing data transfer between a remote computer and a service portal over a network, the media and form including at least one of the following: HTTP file, FTP file, live data stream, file pulled from the remote computer, file pushed by the remote computer, magnetic tape, portable hard drive, CDROM, DVD and optical media;
   the processor suitably programmed to receive from each remote computer an electronic data feed comprising data related to various items on said remote computer;
   the processor suitably programmed to pre-process data feeds whereby:
      the format and structure of the data feed is determined;
      based on the format and structure of the data feed, data is transformed from its original non-standard format to a single, standardized format and stored as a file in the first database;
      a URL link is generated for viewing the contents of the first database online by users;
   the processor suitably programmed to parse each data feed and create one or more tiered categories of data;
   the processor suitably programmed to post-process pre-processed data feeds whereby:
      duplicate data items are detected and removed;
      data items with links that lead to dead or missing pages are detected and removed;
      data is corrected in accordance with one or more formatting and layout rules applied commonly across all data feeds;
   the processor suitably programmed to store the post-processed data in one or more individual separate second databases for subsequent display in response to user requests over a network;
   the processor suitably programmed to generate a URL link that users use on their display device to view the contents of all second databases wherein users have access to and are able to easily and simply browse electronic content from all remote computers in all second databases in one location regardless of the format of the electronic content originally received by said server computer as all electronic content is converted to a standardized format, thereby improving the functionality and efficiency of said server computer;
   the processor suitably programmed to provide the remote computers, via said web-based user interface, a capability to directly manipulate and control the content and appearance of the content of their data feeds remotely over the network, the manipulation includes at least one of the following: change one or more items in a data feed, add one or more items to a data feed, delete one or more items in a data feed, modify one or more characteristics of items in a data feed, modify how items are displayed to users on their display devices including graphics, backgrounds, appearances of pages, color schemes, the number of items on a page, sizes of items displayed, view and configure analytics, modify link tracking, create and configure one or more sub-databases; and
   the processor suitably programmed to receive modified data feeds from a remote computer via the suitable media and form and to automatically update information in second databases in accordance with the updated feed received from the remote computer without any intervention by users, and wherein the user is always presented with a latest version of electronic data to permit simpler, more accurate and improved browsing of the electronic data from said server computer on the display device, thereby improving the structure of and functionality of both the server computer and the users browser and display device.

2. The apparatus according to claim 1, the processor suitably programmed to enable remote computers via the service portal to remotely update data items in a data feed after the transfer of an initial data feed.

3. The apparatus according to claim 1, the processor suitably programmed to adapt to and learn the format of a data feed from a remote computer over time.

4. The apparatus according to claim 1, the processor suitably programmed to enable remote computers to remotely modify the content of their one or more data feeds over the network.

5. The apparatus according to claim 1, the processor suitably programmed whereby remove computers can subscribe to a data feed service.

6. The apparatus according to claim 1, the processor suitably programmed whereby remote computers pay for data feed service.

7. The apparatus according to claim 1, the processor suitably programmed whereby remote computers remotely setup custom data feeds, generate a custom parsing script for mapping of one or more data items.

8. The apparatus according to claim 1, the processor suitably programmed whereby remote computers remotely log into the service portal to add, delete or change data in their respective one or more data feeds.

9. The apparatus according to claim 1, the processor suitably programmed whereby remote computers remotely manipulate the order of items in their data feeds.

10. The apparatus according to claim 1, the processor suitably programmed whereby remote computers can remotely enable and disable one or more data feed options.

11. The apparatus according to claim 1, the processor suitably programmed whereby remote computers remotely upload catalog covers and/or other images.

12. The apparatus according to claim 1, the processor suitably programmed whereby remote computers remotely change how data items in the electronic content are displayed to users on their display devices.

13. The apparatus according to claim 1, the processor suitably programmed whereby remote computers can remotely modify one or more characteristics of data items in their data feeds.

14. The apparatus according to claim 1, the processor suitably programmed to periodically check a remote computer for new or updated data, and in the event thereof, to retrieve and store updated data from the remote computer site in the database on the server computer over a wide area network (WAN), wherein in said updated data is automatically provided to users browsing the electronic content thereby enabling them to always view up to date, accurate information on their display devices.

15. The apparatus according to claim 1, the processor suitably programmed whereby remote computers remotely change, add/delete items in their data feeds, change graphics and perform creative tasks for display by users on their display devices.

16. The apparatus according to claim 1, the processor suitably programmed to dynamically compute and automatically layout items from respective electronic content on pages for display by users on their display devices.

17. The apparatus according to claim 1, the processor suitably programmed to determine if an item in a data feed is featured, and if so, place the featured item in a featured slot on a display page for display by users on their respective display device.

18. The apparatus according to claim 1, the processor suitably programmed to perform image processing and optimization on one or more images within a data feed.

19. The apparatus according to claim 1, further comprising the processor suitably programmed such that all content databases for all remote computers are displayed together and accessible from a single URL.

20. The apparatus according to claim 1, further comprising the processor suitably programmed to receive a search query from a user, execute the search query across all databases from all remote computers and return results of the search query to the user.

21. A method of automatically distributing electronic content from remote computers to a server computer over a communications network, the method comprising:
receiving data feeds at the server computer sent from remote computers over the Internet and storing a first data feed in a first database in the server computer, wherein data for each remote computer is stored separately for each remote computer, the server computer comprising a processor and memory that stores data, and preferences for at least one of parsing, formatting, mapping, correcting, categorizing, and converting the data feed, wherein data received from the remote computer is automatically extracted and formatted and placed in a format suitable for easy and simple browsing, viewing and automatic updating by a user on a display device over the Internet;
generating a URL link to the electronic content to be used by users to access said electronic content wherein users have access to and are able to easily browse electronic content from all remote computers in one location form a single website regardless of the format of the electronic content originally received by said server computer since all electronic content is converted to a standardized format, thereby improving the functionality of said server computer and user's display devices;
receiving first requests on the server computer over the Internet from users via a browser on a display device for one or more items of information from the electronic content accessed via a corresponding URL;
transmitting first responses from the server computer over the Internet to users containing requested one or more items of information from the electronic content;
wherein receipt of the first responses by a user's browser causes electronic content data received from all remote computers to display in a single browser window for easy and convenient browsing on said display device by the user thereby improving the computer functionality of the user's browser and display device;
receiving a second data feed at the server computer sent from the remote computer over the Internet and storing the second data feed in a first database in the server computer, wherein the second data feed contains updated data associated with the electronic content stored in said first database;
receiving second requests on the server computer over the Internet from users via a browser for one or more items of information from the electronic content;
transmitting second responses from the server computer over the Internet to users containing requested one or more items of information from the electronic content;
wherein receipt of the second responses activates the user's browser to cause the one or more items of information received to automatically display in the user's browser on said display device, whereby the information displayed comprises the information automatically updated without any intervention by the user, and wherein the user is always presented with a latest version of electronic data to permit simpler, more accurate and improved browsing of the electronic data from said server computer on the display device, thereby improving the structure of and functionality of both the server computer and the users browser and display device;

redirecting a user to the remote website in response to a user request for more detailed information about a data item;

receiving a search query from a user and executing the search query across all electronic content from all remote computers and returning results of the search query to the user; and wherein the combination of suitably programmed server computer combined with user's browser and corresponding display device provides an improved content distribution and access display system whereby electronic content from all remote computers are accessible via easy, convenient browsing to all users simultaneously on respective display devices and wherein updated electronic content is automatically distributed to users such that users always access up to data electronic content.

22. A method of automatically distributing electronic content over a network from a remote computer to a server computer over a communications network, the method comprising:

receiving data feeds at the server computer from remote computers over the Internet and storing the data feeds in a first database in the server computer, wherein data for from each remote computer is stored separately and associated with separate electronic content, the server computer comprising a processor and memory that stores data and preferences for at least one of parsing, formatting, mapping, correcting, categorizing, and converting data feeds;

converting a data feed from its original format to a single standardized format and storing a first converted data feed on the server computer in the first database;

generating a URL link to the first database to be used by remote computers and users to access the contents of the first database;

receiving first requests on the server computer over the Internet from users via a browser for one or more items of information from the electronic contents of the first database accessed by a corresponding URL;

transmitting first responses from the server computer over the Internet to users containing requested one or more items of information from the electronic contents of the first database;

wherein receipt of the first responses by a user's browser causes the electronic data sourced from the remote computers to display in the user's browser for easy and convenient browsing by a user on a corresponding display device;

providing a portal on the server computer for providing a user interface used by remote computers via the Internet to perform at least one of setting up data feeds, submitting future data feeds, manipulating the order of items in their data feed, enabling or disabling one or more display and browsing options, configuring one or more mini-databases, and performing one or more modifications of the data feed;

receiving a second data feed at the server computer sent from the remote computer over the Internet and storing the second data feed in the first database in the server computer, wherein the second data feed contains updated data associated with the electronic content in the first database;

converting the second feed from its original format to a single standardized format and storing a second converted data feed in the first database on the server computer so as to enable simple and convenient browsing and display of all electronic content received from all remote computers in said first database and accessible via a single website on a user's display device;

receiving second requests on the server computer over the Internet from users via a browser for one or more items of information from the first database;

transmitting second responses from the server computer over the Internet to users containing requested one or more items of information from the first database;

wherein receipt of the second responses by a user's browser causes the one or more items of updated data to display in the user's browser thereby automatically presenting a user with latest accurate data from the first database, whereby the information displayed comprises the information automatically updated without any intervention by the user, and wherein the user is always presented with a latest version of electronic data to permit simpler, more accurate and improved browsing of the electronic data from said server computer on the display device, thereby improving the structure of and functionality of both the server computer and the users browser and display device; and redirecting a user to the remote website in response to a user request for more detailed information about a data item.

23. A method of improved distribution, updating and presentation of electronic content from multiple remote computers, the method comprising:

receiving data feeds at a server computer sent from remote computers over the Internet and storing the data feeds in a first database in the server computer, wherein data from each remote computer is stored separately and associated with certain electronic content, the server computer comprising a processor and memory that stores data and preferences for at least one of parsing, formatting, mapping, correcting, categorizing, and converting the data feed;

transforming the first data feed received from the remote computer in accordance with configured preferences to generate electronic content therefrom, said electronic content including data associated with a single remote computer, wherein data received from the remote computer is automatically extracted and transformed and placed in a format suitable for easy and simple browsing and viewing by a user on a display device;

storing said electronic content including associated transformed feed data on the server computer;

generating a URL link to the electronic content to be used by remote computers and users to access the electronic content, wherein users have access to and are able to easily browse electronic content from all remote computers in one location regardless of the format of the electronic content originally received by said server computer since all electronic content is converted to a standardized format, thereby improving the functionality of said server computer;

receiving first requests on the server computer over the Internet from users via a browser for one or more items of information from the electronic content accessed via a corresponding URL;

causing first responses to be transmitted from the server computer over the Internet to users containing requested one or more items of information from the electronic content;

wherein receipt of the first responses by a user's browser causes the one or more items of data to display in the user's browser on a corresponding display device, thereby enabling the user access to and ability to browse electronic content derived and uniformly transformed from data feeds received from all remote computers;

receiving a second updated data feed at the server computer sent from the remote computer over the Internet and storing the second updated data feed in the first database in the server computer, wherein the second updated product data feed contains one or more updated items of data associated with the electronic content;

receiving second requests on the server computer over the Internet from users via a browser for one or more items of information from the electronic content;

causing second responses to be transmitted from the server computer over the Internet to users containing requested one or more items of information from the electronic content;

wherein receipt of the second responses by a user's browser causes the updated one or more items of data to automatically display in the user's browser, whereby the information displayed comprises the information automatically updated without any intervention by the user, and wherein the user is always presented with most recent electronic data to permit simpler, more accurate and improved browsing of the electronic data from said server computer on the display device, thereby improving the structure of and functionality of both the server computer and the users browser and display device;

receiving a search query from a user and executing the search query across electronic content received from all remote computers and returning the results of the search query to the user; and causing a user to be redirected to a particular external website in response to a request for additional detailed information about a data item.

* * * * *